United States Patent
Kaneda

(10) Patent No.: US 11,906,893 B2
(45) Date of Patent: Feb. 20, 2024

(54) OPTICAL SYSTEM

(71) Applicant: SONY GROUP CORPORATION, Tokyo (JP)

(72) Inventor: Kazumasa Kaneda, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/794,041

(22) PCT Filed: Jan. 26, 2021

(86) PCT No.: PCT/JP2021/002634
§ 371 (c)(1),
(2) Date: Jul. 20, 2022

(87) PCT Pub. No.: WO2021/157430
PCT Pub. Date: Aug. 12, 2021

(65) Prior Publication Data
US 2023/0046512 A1    Feb. 16, 2023

(30) Foreign Application Priority Data

Feb. 5, 2020   (JP) .................................. 2020-017995

(51) Int. Cl.
*G03B 33/08*   (2006.01)
*G03B 21/20*   (2006.01)

(52) U.S. Cl.
CPC ........... *G03B 33/08* (2013.01); *G03B 21/204* (2013.01); *G03B 21/2073* (2013.01)

(58) Field of Classification Search
CPC ... G03B 33/08; G03B 21/204; G03B 21/2073
(Continued)

(56) References Cited

U.S. PATENT DOCUMENTS 9,939,719 B2 *   4/2018   Bommersbach ..... H04N 9/3158
2014/0254129 A1 *   9/2014   Miyoshi ............... G03B 21/204
362/84

(Continued)

FOREIGN PATENT DOCUMENTS

CN   205003432   1/2016
CN   206819040   12/2017
(Continued)

OTHER PUBLICATIONS

International Search Report and Written Opinion prepared by the Japan Patent Office dated Apr. 5, 2021, for International Application No. PCT/JP2021/002634, 3 pgs.

*Primary Examiner* — Jerry L Brooks
(74) *Attorney, Agent, or Firm* — Sheridan Ross PC

(57) ABSTRACT

An optical system of the disclosure includes: a fluorescent unit that includes a phosphor region excited by a first color light beam to output fluorescent light including at least one color light beam, and outputs the first color light beam in a first period and outputs the fluorescent light in a second period; one or two light valves illuminated by at least one of the first color light beam or the fluorescent light; and a region division element including first and second regions and disposed on an optical path between the fluorescent unit and the one or two light valves, the first region outputting the first color light beam and the fluorescent light from the fluorescent unit to be able to reach the one or two light valves, the second region outputting the fluorescent light from the fluorescent unit to be able to reach the one or two light valves.

12 Claims, 28 Drawing Sheets

(58) Field of Classification Search
USPC .......................................................... 353/20
See application file for complete search history.

(56) References Cited

U.S. PATENT DOCUMENTS

| | | | |
|---|---|---|---|
| 2015/0153636 A1 | 6/2015 | Hartwig | |
| 2015/0222864 A1 | 8/2015 | Inoko | |
| 2016/0088273 A1* | 3/2016 | Fukui | G02B 26/007 |
| | | | 353/31 |
| 2018/0246400 A1 | 8/2018 | Takagi et al. | |
| 2018/0259839 A1 | 9/2018 | Okuda | |

FOREIGN PATENT DOCUMENTS

| | | |
|---|---|---|
| JP | 2014-174264 | 9/2014 |
| JP | 2015-163947 | 9/2015 |
| JP | 2018-138941 | 9/2018 |
| JP | 2018-146951 | 9/2018 |
| JP | 2019-133080 | 8/2019 |
| WO | WO 2019/130520 | 4/2019 |

* cited by examiner

FIG. 21

| DIFFRACTION EFFICIENCY / CALCULATION PARAMETER | |
|---|---|
| λB | 455 (nm) |
| λG | 550 (nm) |
| λR | 630 (nm) |
| NUMBER OF STEPS | ∞ |
| n1B | 1.524694 |
| n2B | 1 |
| n1G | 1.506416 |
| n2G | 1 |
| n1R | 1.503274 |
| n2R | 1 |

FIG. 22

| DIFFRACTION EFFICIENCY AT GROOVE DEPTH OF 3500 (nm) | |
|---|---|
| B EFFICIENCY (+4TH-ORDER LIGHT) | 99.6 (%) |
| G EFFICIENCY (+3RD-ORDER LIGHT) | 84.7 (%) |
| R EFFICIENCY (+3RD-ORDER LIGHT) | 87.1 (%) |

OPTICAL SYSTEM

CROSS REFERENCE TO RELATED APPLICATIONS

This application is a national stage application under 35 U.S.C. 371 and claims the benefit of PCT Application No. PCT/JP2021/002634, having an international filing date of 26 Jan. 2021, which designated the United States, which PCT application claimed the benefit of Japanese Patent Application No. 2020-017995, filed 05 Feb. 2020, the entire disclosures of each of which are incorporated herein by reference.

TECHNICAL FIELD

The present disclosure relates to an optical system suitable for a projector and the like.

BACKGROUND ART

A projector that performs full-color display may uses, as a light source, a phosphor light source in some cases (see, e.g., PTL 1). For example, in the phosphor light source, B (blue) light is used as excitation light, and yellow light including R (red) light or G (green) light is generated as fluorescent light.

CITATION LIST

Patent Literature
[PTL 1] Japanese Unexamined Patent Application Publication No. 2019-133080

SUMMARY OF THE INVENTION

For example, in a case of using a phosphor light source in a time-division projector in which one or two light valves are used, excitation light is mixed with fluorescent light, leading to a possibility that sufficient color separation may not be possible, thus causing a color gamut (color reproducibility) to be deteriorated.

It is desirable to provide an optical system that makes it possible to suppress a deterioration in a color gamut.

An optical system according to an embodiment of the present disclosure includes: a fluorescent unit including a phosphor region excited by a first color light beam to output fluorescent light including at least one color light beam, the fluorescent unit outputting the first color light beam in a first period and outputting the fluorescent light in a second period; one or two light valves illuminated by at least one of the first color light beam or the fluorescent light; and a region division element including a first region and a second region and being disposed on an optical path between the fluorescent unit and the one or two light valves, the first region having a property of outputting the first color light beam and the fluorescent light from the fluorescent unit to be able to reach the one or two light valves, the second region having a property of outputting the fluorescent light from the fluorescent unit to be able to reach the one or two light valves.

In the optical system according to the embodiment of the present disclosure, in the region division element, the first region outputs the first color light beam and the fluorescent light from the fluorescent unit to be able to reach the one or two light valves. The second region outputs the fluorescent light from the fluorescent unit to be able to reach the one or two light valves.

BRIEF DESCRIPTION OF THE DRAWINGS

FIG. 21 is an explanatory diagram illustrating an example of calculation parameters used to calculate the diffraction efficiency of the blazed diffraction grating.

FIG. 22 is an explanatory diagram illustrating an example of calculation results of the diffraction efficiency of the blazed diffraction grating.

MODES FOR CARRYING OUT THE INVENTION

Hereinafter, description is given in detail of embodiments of the present disclosure with reference to the drawings. It is to be noted that the description is given in the following order.
0. Comparative Examples (FIGS. 1 to 3)
1. First Embodiment (Projector in which two light valves and a reflective phosphor wheel are used) (FIGS. 4 to 15)
1.1 Configuration and Action of Optical System according to First Embodiment
1.2 Effects
1.3 Modification Example (A modification example of a placement position of a region division element)
2. Second Embodiment (A configuration example in which a polarizing dichroic plate itself is adopted as a region division element) (FIGS. 16 to 17)
3. Third Embodiment (A region division element using a diffraction grating) (FIGS. 18 to 22)
4. Fourth Embodiment (A configuration example with a reduced diameter of a ¼ wave plate) (FIGS. 23 to 24)
5. Fifth Embodiment (A configuration example in which blue light is incident on two light valves) (FIGS. 25 to 26)
6. Sixth Embodiment (A projector in which two light valves and a transmissive phosphor wheel are used) (FIGS. 27 to 28)
7. Seventh Embodiment (A projector in which one light valve and a reflective phosphor wheel are used) (FIGS. 29 to 30)
8. Eighth Embodiment (A projector in which one light valve and a transmissive phosphor wheel are used)
9. Other Embodiments <0. Comparative Example>

(Overview and Issue of Optical System in Comparative Examples)

Examples of a full-color display method for a projector include methods called a three-panel type, two-panel type, and a single-panel type, depending on the number of light valves to be used.

Figure 1:
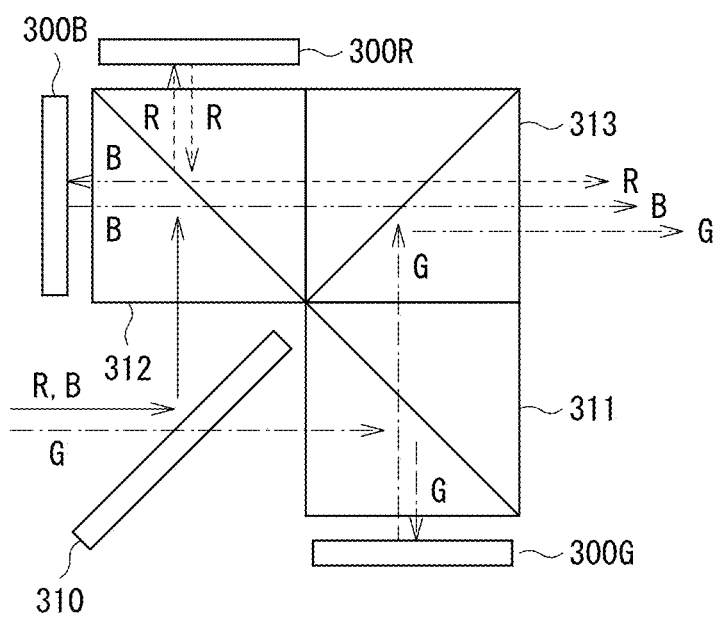
FIG. 1 is a main part configuration diagram schematically illustrating a main part of a first configuration example of a projector according to a comparative example.

FIG. 1 schematically illustrates a main part of a first configuration example of a projector according to a comparative example.

FIG. 1 illustrates a main part configuration example of a three-panel projector in which three light valves of a red light valve 300R, a green light valve 300G, and a blue light valve 300B are used. The red light valve 300R, the green light valve 300G, and the blue light valve 300B are each illuminated by illumination light from an unillustrated illumination optics system. The red light valve 300R is illuminated by red light via a polarizing dichroic mirror 310 and a PBS (polarization beam splitter) 312. The green light valve 300G is illuminated by green light via the polarizing dichroic mirror 310 and a PBS 311. The blue light valve 300B is illuminated by blue light via the polarizing dichroic mirror 310 and the PBS 312. The red light valve 300R, the green light valve 300G, and the blue light valve 300B each modulate respective color light beams. The respective color light beams after having been modulated are synthesized by a synthesizing prism 313 to form image light. The image light after having been synthesized is projected onto a projection surface such as a screen by an unillustrated projection optics system.

Figure 2:
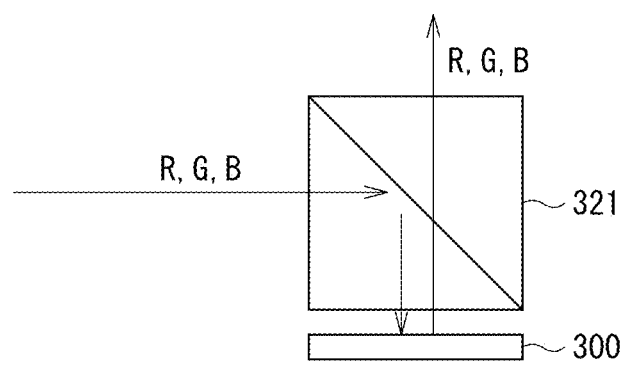
FIG. 2 is a main part configuration diagram schematically illustrating a main part of a second configuration example of the projector according to the comparative example.

FIG. 2 schematically illustrates a main part of a second configuration example of the projector according to the comparative example.

FIG. 2 illustrates a main part configuration example of a single-panel projector in which one light valve 300 is used. The one light valve 300 is illuminated by illumination light from an unillustrated illumination optics system. Red light, green light, and blue light are time-divisionally incident on the one light valve 300 via a PBS 321. The one light valve 300 time-divisionally modulates each color light beam. Each color light beam after having been modulated forms time division image light. The image light of each color is time-divisionally projected onto a projection surface such as a screen by an unillustrated projection optics system.

Figure 3:
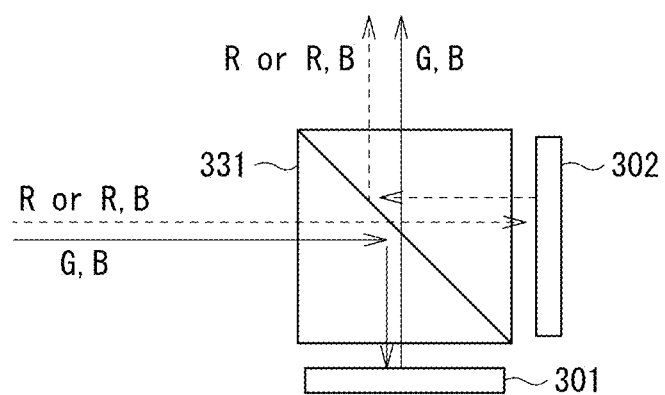
FIG. 3 is a main part configuration diagram schematically illustrating a main part of a third configuration example of the projector according to the comparative example.

FIG. 3 schematically illustrates a main part of a third configuration example of the projector according to the comparative example.

FIG. 3 illustrates a main part configuration example of a two-panel projector in which two light valves of the first light valve 301 and a second light valve 302 are used. The first light valve 301 and the second light valve 302 are each illuminated by illumination light from an unillustrated illumination optics system. For example, green light and blue light are time-divisionally incident on the first light valve 301 via a PBS 331. Red light is incident on the second light valve 302 via the PBS 331. Alternatively, red light and blue light are time-divisionally incident on the second light valve 302 via the PBS 331. Each of the first light valve 301 and the second light valve 302 time-divisionally modulates each color light beam. Each color light beam after having been modulated forms time division image light. Image light of each color is time-divisionally projected onto a projection surface such as a screen by an unillustrated projection optics system.

Among the configuration examples described above, the three-panel projector has independent optical paths for the respective colors, and sufficient color separation is possible also for a color-mixed light flux for each wavelength using a dichroic filter or a polarizing filter, thus having less influence on a color gamut.

Meanwhile, in the single-panel type and the two-panel type, multiple color light beams with different wavelengths reach one or two light valves through a common optical path. For this reason, there is a possibility that sufficient color separation may not be possible, thus causing the color gamut (color reproducibility) to be deteriorated.

In addition, in a projector that performs full-color display, a phosphor light source may be used as a light source in some cases. In the phosphor light source, for example, blue light is used as excitation light, and yellow light including red light or green light is generated as fluorescent light. Examples of a method for the phosphor light source include a method using a transmissive phosphor wheel and a method of using a reflective phosphor wheel.

The method of using the transmissive phosphor wheel provides, for example, a wide color gamut, because it is possible to reduce blue light mixed with fluorescent light using a filter having a dichroic property and thus to transmit required red light and green light to the illumination optics system. Meanwhile, an optics system is required before and after the transmissive phosphor wheel, and thus the entire optics system becomes large, thus making it difficult to reduce the size of the projector.

In the method of using the reflective phosphor wheel, it is possible to use less optics system as compared with the method of using the transmissive phosphor wheel, thus making it easier to reduce the size of the projector. Meanwhile, an incident optical path of excitation light and an output optical path of fluorescent light are partially commonalized, leading to a possibility that sufficient color separation may not be possible for blue light mixed with fluorescent light, thus causing the color gamut (color reproducibility) to be deteriorated.

Therefore, in a case of using one or two light valves, it is desirable that an optical system be developed that makes it possible to suppress a deterioration in the color gamut.

In the following embodiments, description is given of a configuration example in which an optical system according to the technology of the present disclosure is applied to a projector. However, the technology of the present disclosure is applicable not only to a projector but also to an exposure apparatus and the like.

Figure 4:
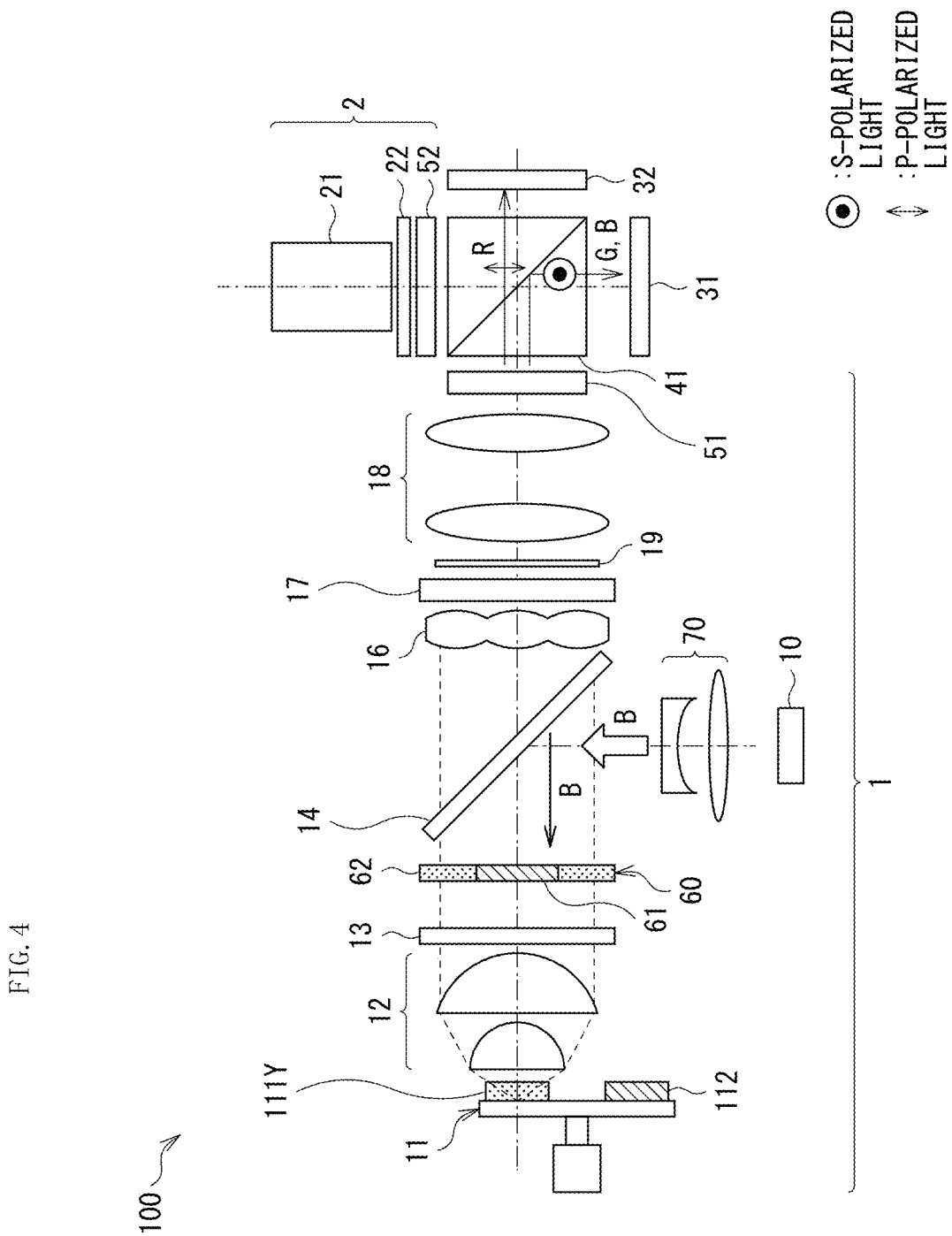
FIG. 4 is a configuration diagram schematically illustrating an overall configuration example of a projector as an optical system according to a first embodiment of the present disclosure.

<1. First Embodiment>
[1.1 Configuration and Action of Optical System according to First Embodiment]
(Overview of Optical System)
FIG. 4 schematically illustrates an overall configuration example of a projector 100 as an optical system according to a first embodiment of the present disclosure.

The projector 100 according to the first embodiment is of a two-panel type, and adopts a method of using a reflective phosphor wheel 11. Description is given of the projector 100 according to the first embodiment, by exemplifying a case where multiple color light beams include first to third color light beams. For example, blue light corresponds to a specific example of a "first color light beam" in the technology of the present disclosure; for example, green light corresponds to a specific example of a "second color light beam" in the technology of the present disclosure; and, for example, red light corresponds to a specific example of a "third color light beam" in the technology of the present disclosure As illustrated in FIG. 4, the projector 100 according to the first embodiment includes an illumination optics system 1 and a projection optics system 2. In addition, the projector 100 includes a first light valve 31, a second light valve 32, and a PBS 41 on an optical path between the illumination optics system 1 and the projection optics system 2.

The illumination optics system 1 includes a blue light source 10, the reflective phosphor wheel 11, a light-condensing lens 12, a QWP (¼ wave plate) 13, a polarizing dichroic plate 14, a fly-eye lens array 16, a PS converter (polarization conversion element) 17, a polarizer 19, a first wavelength selective wave plate (first polarization rotation element) 51, and a reduction optics system 70. The illumination optics system 1 further includes a region-division wavelength selective filter 60 on an optical path between the ¼ wave plate 13 and the polarizing dichroic plate 14.

The projection optics system 2 includes a projection lens 21, a second wavelength selective wave plate (second polarization rotation element) 52, and a polarizer 22.

It is to be noted that, in FIG. 4, a direction orthogonal to the sheet is set as that of S-polarized light for the PBS 41, and a direction orthogonal to an optical axis and parallel to an in-plane direction of the sheet is set as that of P-polarized light for the PBS 41. The same also applies to other following drawings. In addition, the same also applies to other following embodiments.

The reflective phosphor wheel 11 corresponds to a specific example of a "fluorescent unit" in the technology of the present disclosure. The region-division wavelength selective filter 60 corresponds to a specific example of a "region division element" in the technology of the present disclosure.

The illumination optics system 1 generates illumination light including multiple color light beams in mutually different wavelength bands. The illumination optics system 1 generates, as multiple color light beams, respective color light beams of red light, green light, and blue light, and outputs them toward the PBS 41.

The first wavelength selective wave plate 51 has a property of selectively converting a polarization direction (polarization rotation) of each of the color light beams of the red light, the green light, and the blue light in all of regions. The second wavelength selective wave plate 52 also has a similar property. For example, the second wavelength selective wave plate 52 has properties of converting the green light and the blue light into S-polarized light and converting the red light into P-polarized light.

The polarizer 19 and the polarizer 22 have a property of cutting leaked light of which a polarization direction is not aligned. This allows the contrast to be improved.

The first light valve 31 and the second light valve 32 are each illuminated by at least one color light beam of multiple color light beams. The PBS 41 causes each color light beam from the illumination optics system 1 to be incident on one of the first light valve 31 or the second light valve 32 depending on the polarization direction. For example, the PBS 41 causes blue light to be incident on the first light valve 31. In addition, for example, the PBS 41 causes green light to be incident on the first light valve 31. In addition, for example, the PBS 41 causes red light to be incident on the second light valve 32. In addition, the PBS 41 outputs the respective color light beams modulated by the first light valve 31 and the second light valve 32 toward the projection optics system 2 depending on the polarization direction.

The first light valve 31 and the second light valve 32 each modulate at least one color light beam of the multiple color light beams depending on an image signal, for example.

Each color light beam after having been modulated by the first light valve 31 and the second light valve 32 is incident on the projection optics system 2 via the PBS 41. The projection optics system 2 projects an image generated by the first light valve 31 and the second light valve 32 onto a projection surface such as an unillustrated screen.

(Detailed Configuration and Action of Each Component)

Figure 5:
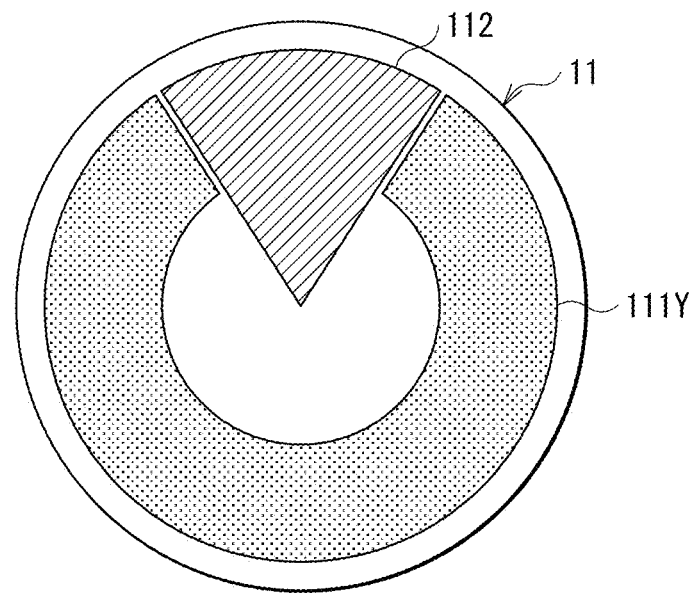
FIG. 5 is a plan view schematically illustrating a configuration example of a reflective phosphor wheel in the optical system according to the first embodiment.
Figure 6:
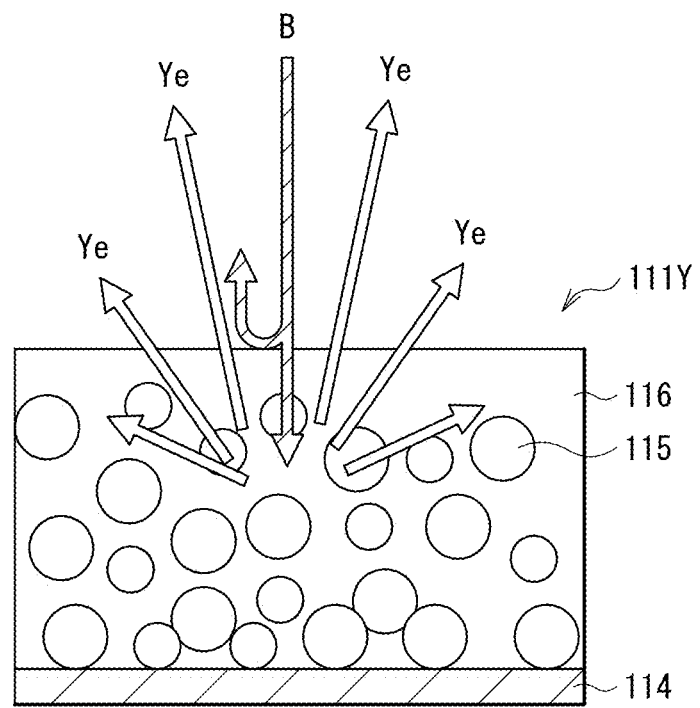
FIG. 6 is a cross-sectional view schematically illustrating a configuration example of a phosphor region of the reflective phosphor wheel in the optical system according to the first embodiment.
Figure 7:
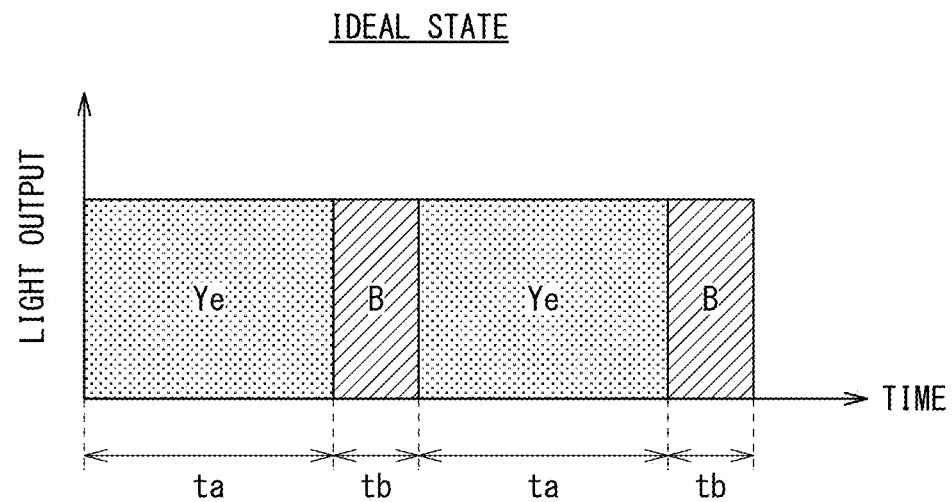
FIG. 7 is an explanatory diagram schematically illustrating an example of an ideal state of light outputted from the reflective phosphor wheel.
Figure 8:
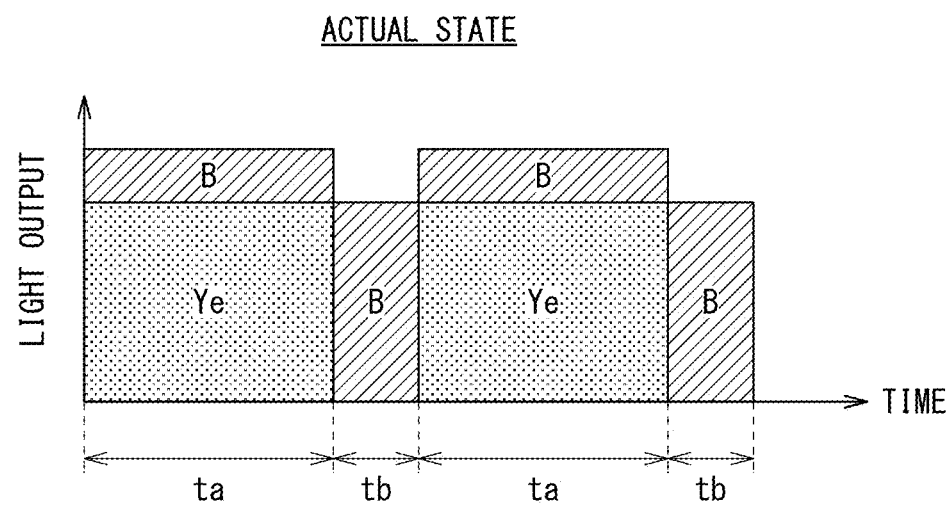
FIG. 8 is an explanatory diagram schematically illustrating an example of an actual state of the light outputted from the reflective phosphor wheel.
Figure 9:
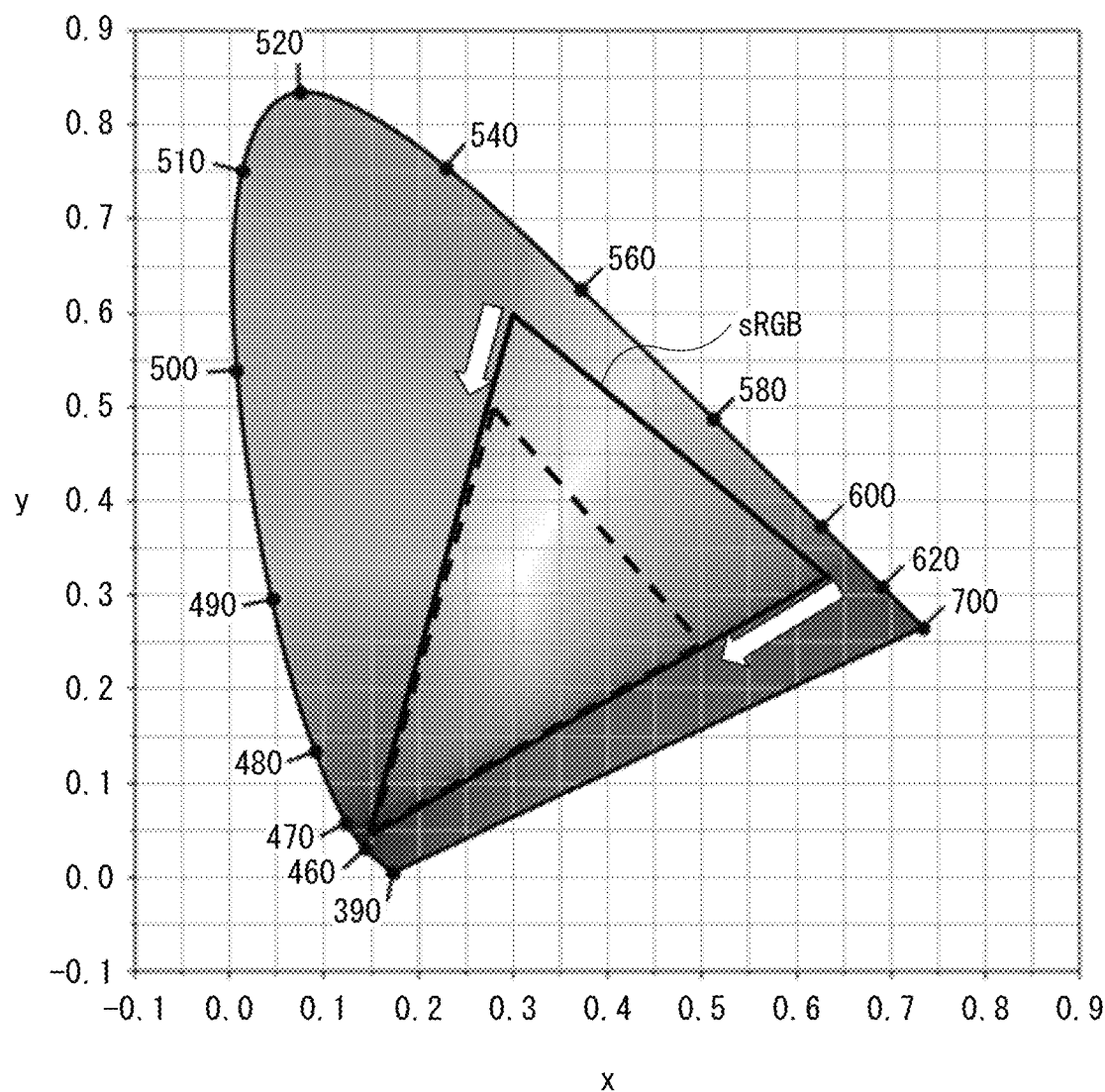
FIG. 9 is an explanatory diagram schematically illustrating an example of a deterioration in a color gamut caused by the state in FIG. 8.

FIG. 5 schematically illustrates a planar configuration example of the reflective phosphor wheel 11. FIG. 6 schematically illustrates a configuration example of a phosphor region 111Y of the reflective phosphor wheel 11. FIG. 7 schematically illustrates an example of an ideal state of light outputted from the reflective phosphor wheel 11. FIG. 8 schematically illustrates an example of an actual state of the light outputted from the reflective phosphor wheel 11. FIG. 9 schematically illustrates an example of a deterioration in a color gamut caused by the state in FIG. 8. It is to be noted that FIG. 9 illustrates an xy-chromaticity diagram.

The blue light source 10 is, for example, a blue laser. The reflective phosphor wheel 11 includes the phosphor region 111Y and a reflective diffuser region 112 as illustrated in FIG. 5. Yellow (Ye) light is obtained as fluorescent light by irradiating the phosphor region 111Y with blue light excitation light. The phosphor region 111Y reflects and diffuses the yellow light as the fluorescent light to output the yellow light. The reflective diffuser region 112 does not have a polarization action, but has a reflection action with respect to the blue light. That is, the reflective diffuser region 112 reflects and diffuses the blue light in a state of holding a polarization direction of the blue light to output the blue light. Therefore, a time-average white light beam obtained by temporally repeating yellow, blue, yellow, blue . . . is ideally outputted from the phosphor wheel 11, as illustrated in FIG. 7. In FIG. 7, the period in which the blue light is outputted by the reflective diffuser region 112 is set as a blue light output period (first period) tb, and the period in which the fluorescent light is outputted by the phosphor region 111Y is set as a phosphor light-emission period (second period) ta.

Incidentally, as illustrated in FIG. 6, the phosphor region 111Y of the reflective phosphor wheel 11 has a configuration in which particles of a phosphor 115 are dispersed in a resin 116 on a reflective substrate 114. Besides the yellow light as the fluorescent light, blue light remaining without being subjected to fluorescence conversion is also outputted in a mixed state from the phosphor region 111Y Therefore, the outputted light is not precisely in a state in FIG. 7 where the yellow light and the blue light are completely separated temporally, but in a state where the yellow light and the blue light are mixed in the phosphor light-emission period ta, as illustrated in FIG. 8. Therefore, the illumination light to be eventually incident on the first light valve 31 and the second light valve 32 does not undergo sufficient color separation, thus causing the color gamut to be deteriorated. For example, as illustrated in FIG. 9, in a case where an attempt is made to achieve a color space of sRGB, the color space is pulled in a direction of a blue color, resulting in the color space as indicated by a broken line in FIG. 9.

As described below, in the projector 100 according to the first embodiment, it is possible to suppress a deterioration in the color gamut as described above by an action of the region-division wavelength selective filter 60.

Figure 10:
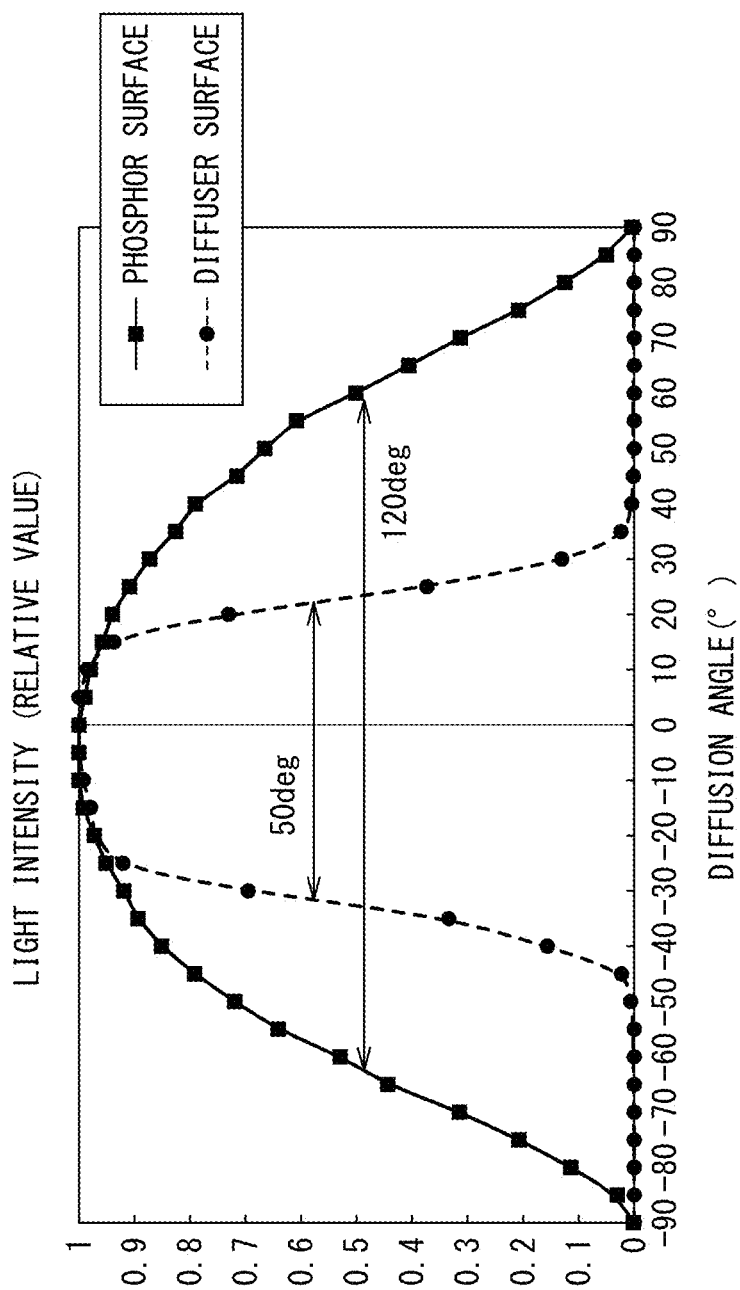
FIG. 10 is an explanatory diagram schematically illustrating examples of diffusion angles of light in the phosphor region and in a reflective diffuser region in the reflective phosphor wheel.

FIG. 10 schematically illustrates examples of diffusion angles of light in the phosphor region 111Y and in the reflective diffuser region 112 of the reflective phosphor wheel 11.

In the projector 100 according to the first embodiment, the diffusion angle of the light in the reflective diffuser region 112 is adjustable. In the projector 100 according to the first embodiment, the diffusion angle of the light in the reflective diffuser region 112 is desirably about a half of the diffusion angle of the light in the phosphor region 111Y.

Figure 11:
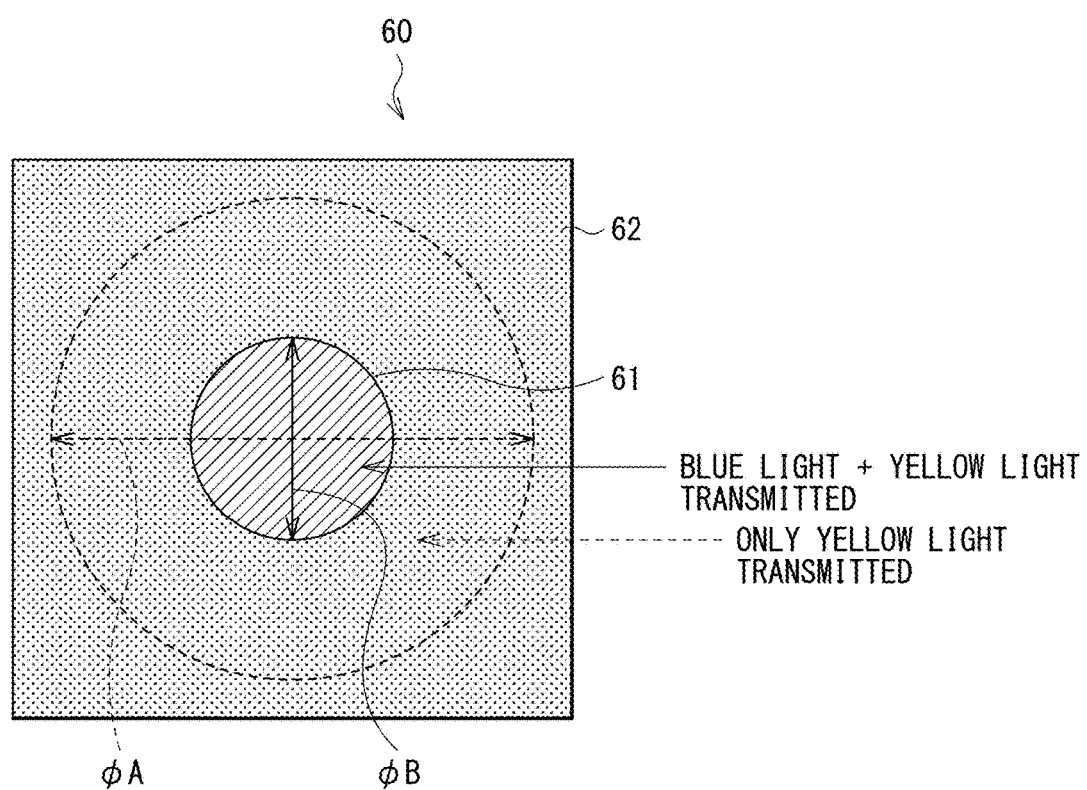
FIG. 11 is a plane view schematically illustrating an example of a configuration and an action of a region-division wavelength selective filter in the optical system according to the first embodiment.
Figure 12:
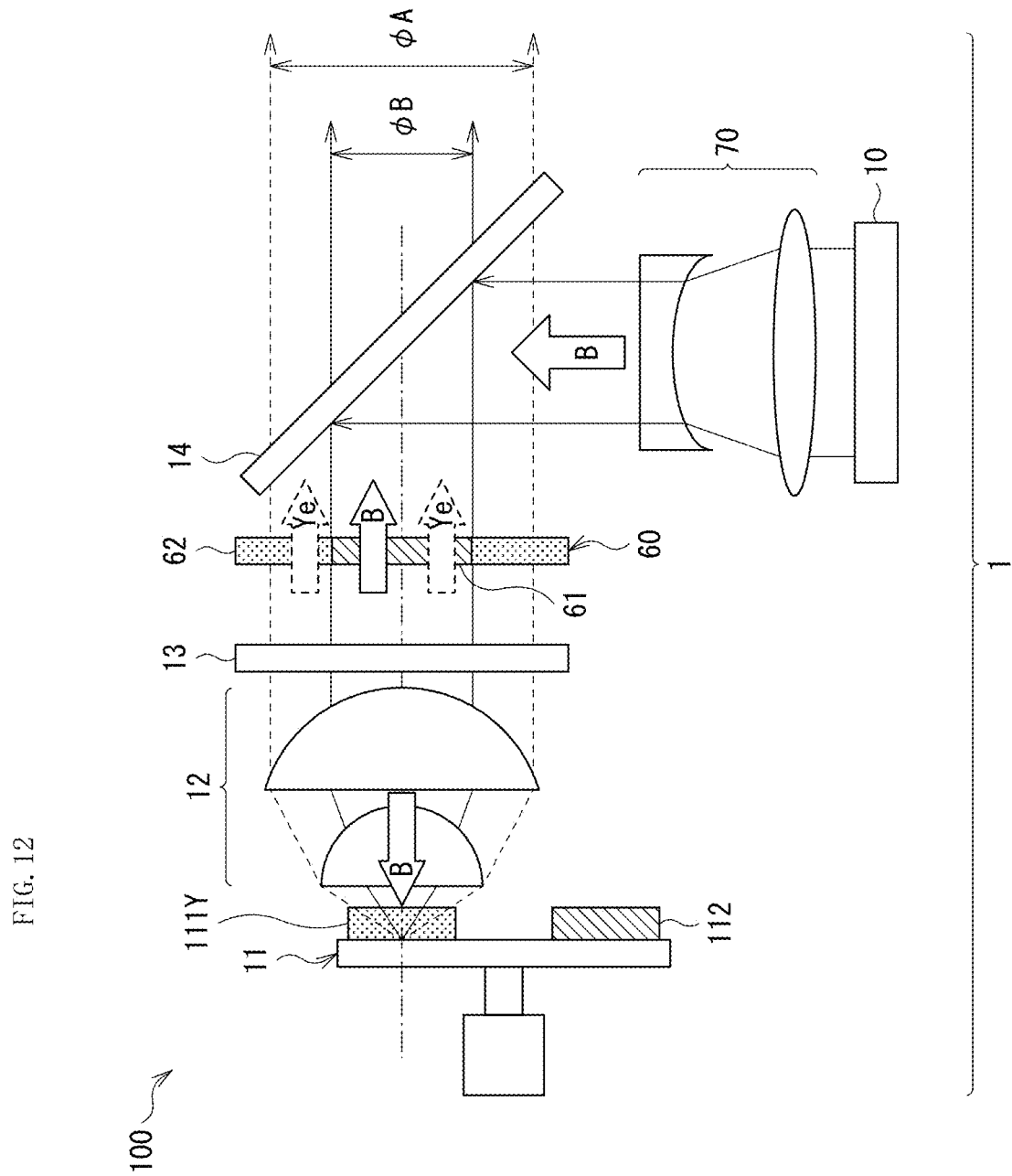
FIG. 12 is a main part configuration diagram schematically illustrating an example of the action of the region-division wavelength selective filter in the optical system according to the first embodiment.

FIG. 11 schematically illustrates an example of a planar configuration and an action of the region-division wavelength selective filter 60. FIG. 12 schematically illustrates an example of the action of the region-division wavelength selective filter 60.

The region-division wavelength selective filter 60 includes a center region (inner peripheral part) 61 and a peripheral region (outer peripheral part) 62. In the region-division wavelength selective filter 60, the peripheral region 62 is a region outside the center region 61. In the region-division wavelength selective filter 60, the center region 61 and the peripheral region 62 are desirably provided concentrically.

The center region 61 corresponds to a specific example of a "first region" in the technology of the present disclosure, and the peripheral region 62 corresponds to a specific example of a "second region" in the technology of the present disclosure.

In the region-division wavelength selective filter 60, the center region 61 and the peripheral region 62 have wavelength selective properties different from each other. In the region-division wavelength selective filter 60, the center region 61 has a property of outputting the blue light and the fluorescent light from the reflective phosphor wheel 11 to be able to reach the first light valve 31 or the second light valve 32. The peripheral region 62 includes a property of outputting only the fluorescent light from the reflective phosphor wheel 11 to be able to reach the first light valve 31 or the second light valve 32. The region-division wavelength selective filter 60 has a property of transmitting the blue light and the yellow light in the center region 61, and has a property of transmitting only the yellow light in the peripheral region 62.

Here, a light flux diameter of a light flux of the light outputted from the phosphor region 111Y is set as $\varphi A$, and a light flux diameter of a light flux of the light outputted from the diffuser region is set as $\varphi B$ ($\varphi A > \varphi B$). $\varphi B$ denotes a light flux diameter of the blue light transmitted through the region-division wavelength selective filter 60, and $\varphi A$ denotes a light flux diameter of the yellow light transmitted through the region-division wavelength selective filter 60. The region-division wavelength selective filter 60 allows unnecessary blue light to be reduced relative to the yellow light, by an area ratio of the center region 61 to the peripheral region 62.

Figure 13:
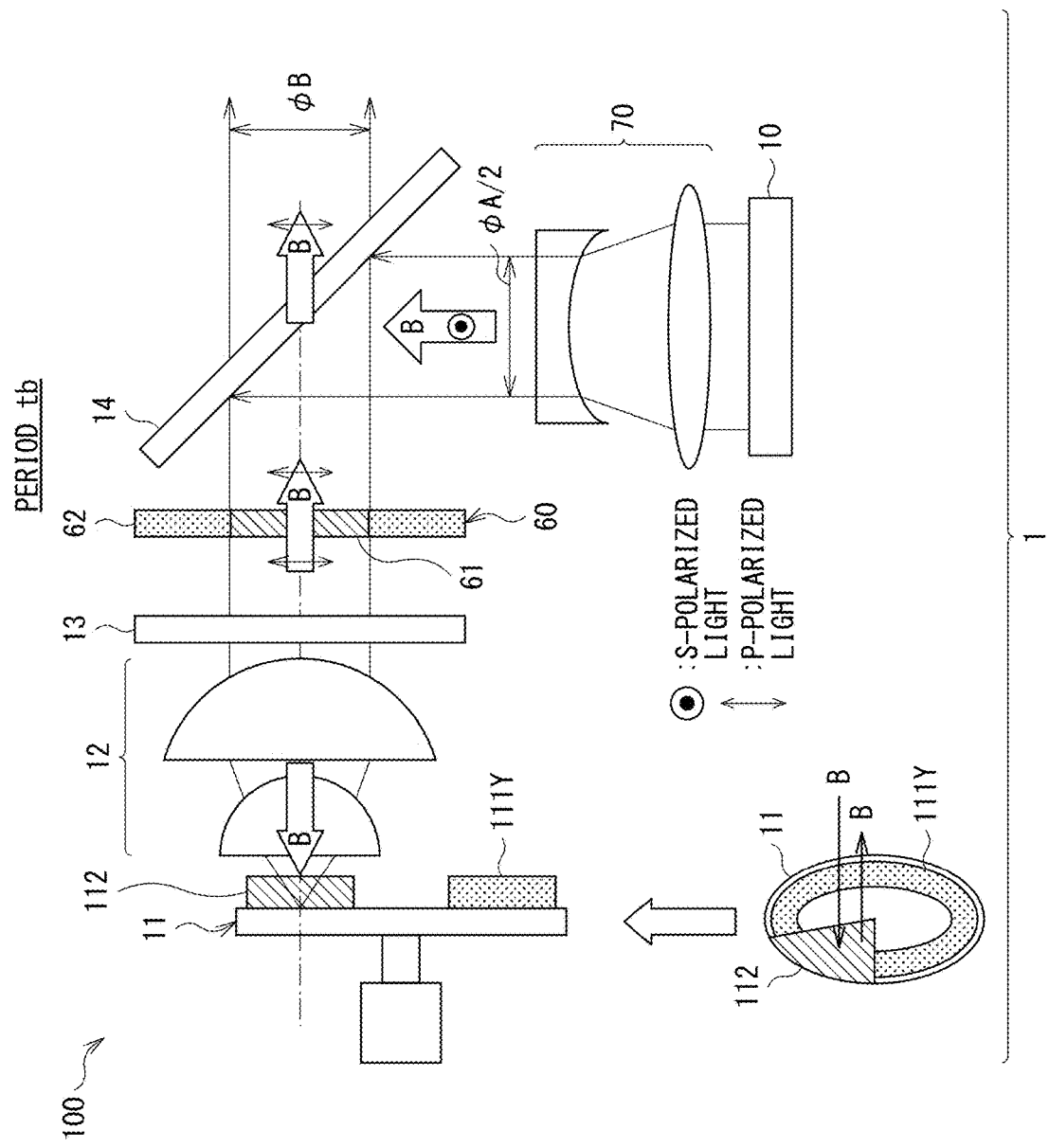
FIG. 13 is a main part configuration diagram schematically illustrating an example of a state of blue light in a blue light output period (first period) in the optical system according to the first embodiment.

FIG. 13 schematically illustrates an example of a state of the blue light in the blue light output period tb in the optical system according to the first embodiment.

As described above, φA denotes a light flux diameter of the light flux of the light outputted from the phosphor region 111Y in the reflective phosphor wheel 11, and φB denotes a light flux diameter of the light flux of the light outputted from the diffuser region. For example, S-polarized blue light is emitted as excitation light from the blue light source 10. The reduction optics system 70 reduces the light flux diameter of the blue light as excitation light to about φA/2. The blue light as excitation light is reflected by the polarizing dichroic plate 14 toward the reflective phosphor wheel 11. At this time, the blue light as excitation light, in a state of the light flux diameter φA/2, is transmitted through the center region 61 of the region-division wavelength selective filter 60 to reach the reflective diffuser region 112 of the reflective phosphor wheel 11. It is to be noted that, as illustrated in FIG. 10 described above, the diffusion angle of the light by the reflective diffuser region 112 is narrower than the diffusion angle of the light by the phosphor region 111Y and is adjustable, thus making it possible to keep the light flux of the blue light reflected by the reflective diffuser region 112 narrow. Here, the blue light reciprocates through the 1/4 wave plate 13 to be thereby converted into P-polarized light. The P-polarized blue light is transmitted through the center region 61 of the region-division wavelength selective filter 60, transmitted through the polarizing dichroic plate 14 without loss in a light amount, and is thereafter outputted to side of the PBS 41.

Figure 14:
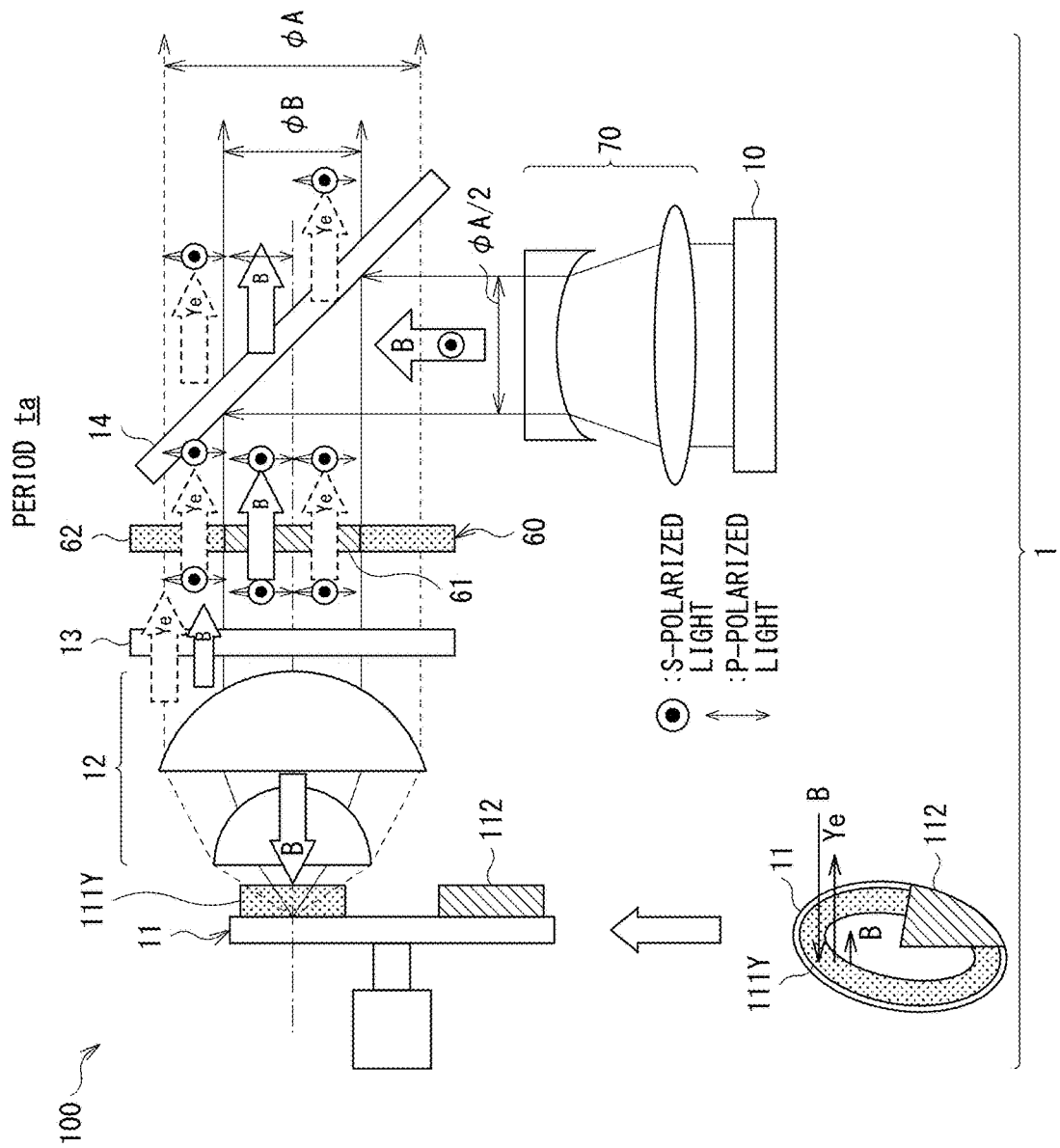
FIG. 14 is a main part configuration diagram schematically illustrating an example of a state of blue light and yellow light in a phosphor light-emission period (second period) in the optical system according to the first embodiment.

FIG. 14 schematically illustrates an example of a state of the blue light and the yellow light in the phosphor light-emission period ta in the optical system according to the first embodiment.

In the phosphor light-emission period ta, the blue light as excitation light reflected by the polarizing dichroic plate 14 and transmitted through the center region 61 of the region-division wavelength selective filter 60 reaches the phosphor region 111Y of the reflective phosphor wheel 11. The phosphor region 111Y reflects and diffuses the yellow light as the fluorescent light to output the yellow light. It is to be noted that the polarization direction of the yellow light to be outputted is random.

As illustrated in FIG. 10 described above, the diffusion angle of the light by the phosphor region 111Y is as wide as about 120 degrees for a total angle, and the light flux diameter of the yellow light to be outputted is large. Meanwhile, in the phosphor region 111Y, there exists a component of blue light mixed with the yellow light and remaining without being subjected to fluorescence conversion due to surface reflection of a phosphor binder and surface reflection of phosphor particles. The diffusion angle of the remaining blue light becomes a wide diffusion angle because of the phosphor region 111Y, and thus the light flux diameter is large similarly to the yellow light.

The region-division wavelength selective filter 60 has a property of transmitting the yellow light in the center region 61 as well as in the peripheral region 62, and thus the randomly polarized yellow light passes as it is through the region-division wavelength selective filter 60 in a state of the light flux diameter φA, is transmitted through the polarizing dichroic plate 14 without loss in a light amount, and thereafter is outputted to the side of the PBS 41. Meanwhile, the unnecessary randomly polarized blue light with the light flux diameter φA mixed with the yellow light is transmitted only through the center region 61 of the region-division wavelength selective filter 60 to reach the polarizing dichroic plate 14. The polarizing dichroic plate 14 transmits only a P-polarized component for the blue light, and thereafter outputs it to the side of the PBS 41. It is to be noted that this component becomes a component to be mixed with the yellow light. However, blue light in a region outside φA/2 of the blue light with the light flux diameter φA is returned to side of the phosphor region 111Y and removed due to the property of the peripheral region 62 of the region-division wavelength selective filter 60. This makes it possible to reduce color mixture of the blue light, as compared with the case where the region-division wavelength selective filter 60 is not provided. Setting the light flux diameter φB to ½ of the light flux diameter φA makes it possible to reduce the color mixture of the blue light to ¼ in an area ratio, as compared with the case where the region-division wavelength selective filter 60 is not provided.

[1.2 Effects]

As described above, according to the optical system of the first embodiment, there is provided the region-division wavelength selective filter 60 including two region having mutually different output properties with respect to the blue light, thus making it possible to improve a color separation property and to suppress a deterioration in a color gamut.

It is to be noted that the effects described herein are merely exemplary and not limiting, and there may be other effects as well. The same applies to effects of the following other embodiments.

[1.3 Modification Example]

Figure 15:
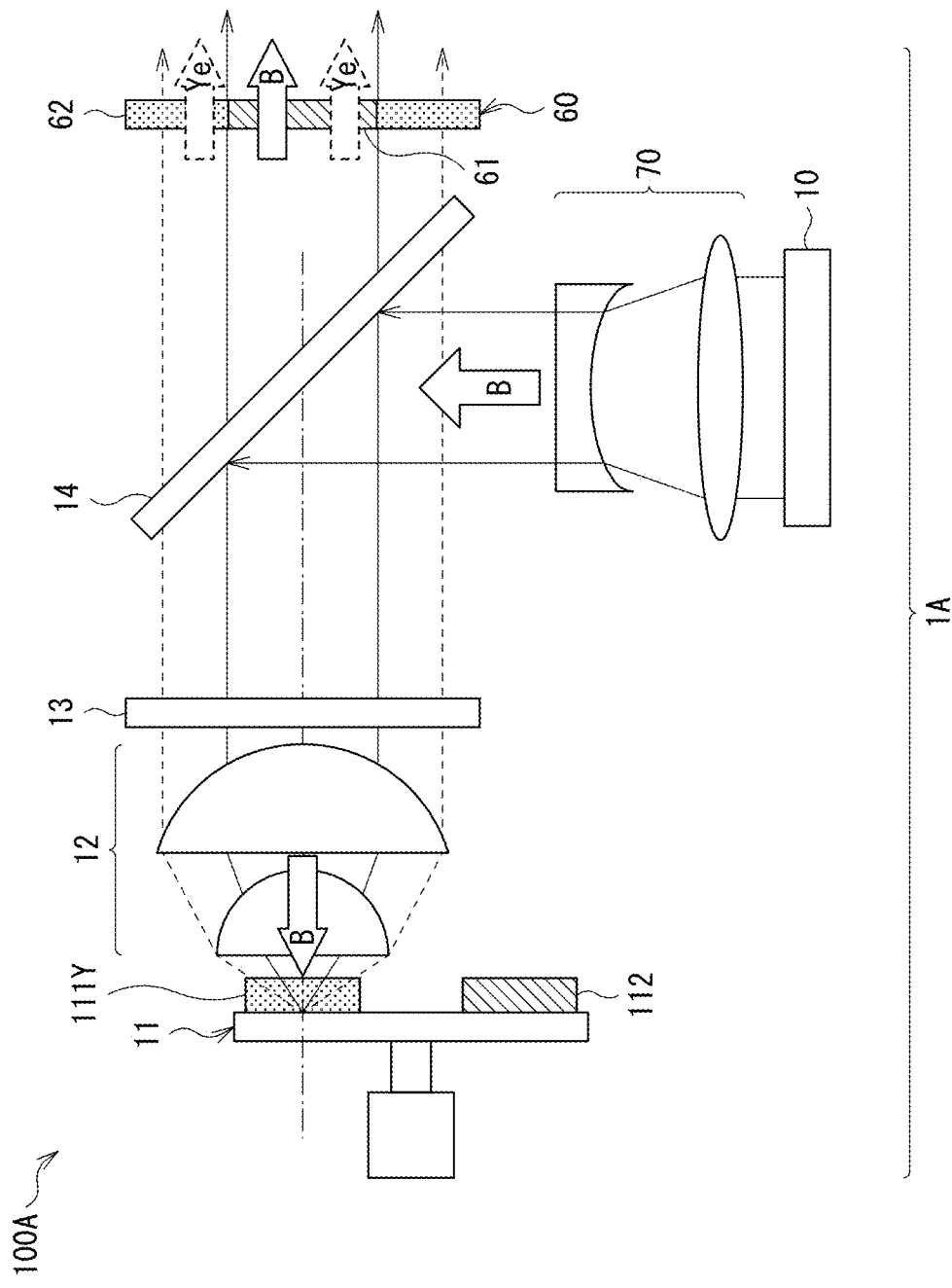
FIG. 15 is a main part configuration diagram schematically illustrating an example of a projector as an optical system according to a modification example of the first embodiment.

FIG. 15 schematically illustrates a main part configuration example of a projector 100A as an optical system according to modification example of the first embodiment.

The projector 100A according to the modification example of the first embodiment includes an illumination optics system 1A instead of the illumination optics system 1 of the projector 100 according to the first embodiment. In the illumination optics system 1A of the projector 100A, the position of the region-division wavelength selective filter 60 is different from that in the illumination optics system 1 of the projector 100 according to the first embodiment. As illustrated in FIG. 15, the region-division wavelength selective filter 60 may be disposed on an optical path between the polarizing dichroic plate 14 and each of the first light valve 31 and the second light valve 32.

Other configurations, actions, and effects may be substantially similar to those of the optical system according to the first embodiment described above.

<2. Second Embodiment>

Next, description is given of an optical system according to a second embodiment of the present disclosure. It is to be noted that, in the following, components substantially the same as those of the optical system according to the first embodiment described above are denoted by the same reference numerals, and descriptions thereof are omitted as appropriate.

Figure 16:
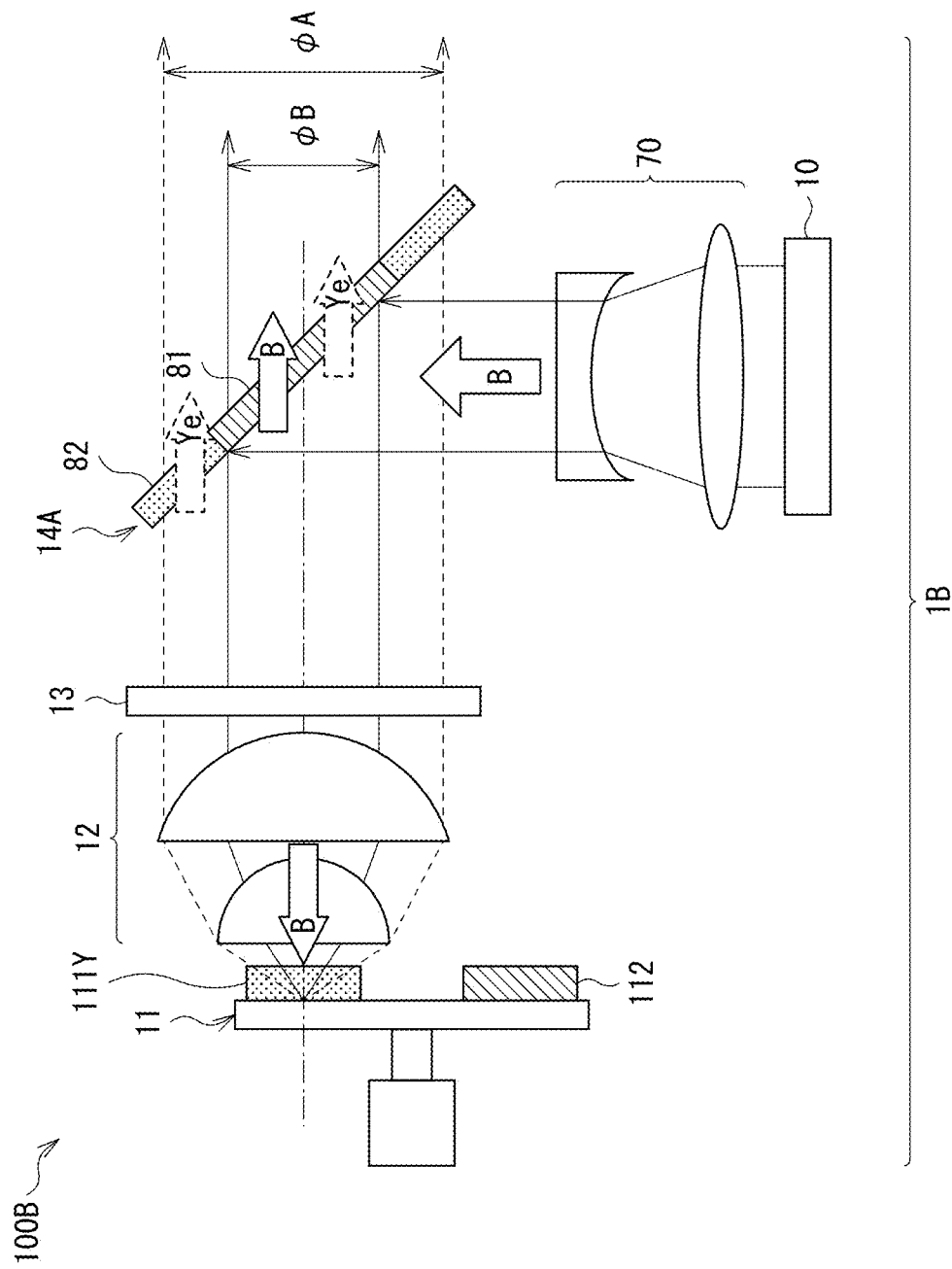
FIG. 16 is a main part configuration diagram schematically illustrating an example of a projector as an optical system according to a second embodiment.

FIG. 16 schematically illustrates a main part configuration of a projector 100B as an optical system according to the second embodiment.

The projector 100B according to the second embodiment includes an illumination optics system 1B instead of the illumination optics system 1 of the projector 100 according to the first embodiment. The illumination optics system 1B of the projector 100B includes a polarizing dichroic plate 14A instead of the region-division wavelength selective filter 60 and the polarizing dichroic plate 14 in the first embodiment.

The polarizing dichroic plate 14A corresponds to a specific example of the "region division element" in the technology of the present disclosure.

Figure 17:
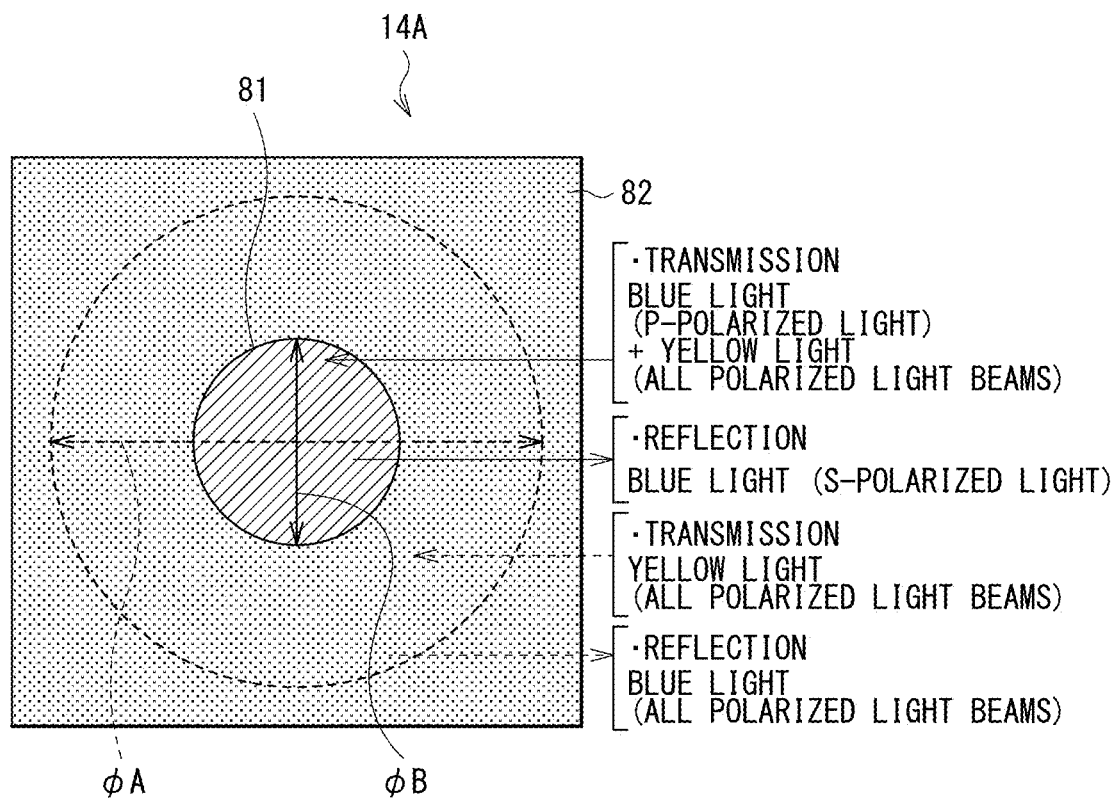
FIG. 17 is a plan view schematically illustrating an example of a configuration and an action of a polarizing dichroic plate in the optical system according to the second embodiment.

FIG. 17 schematically illustrates an example of a configuration and an action of the polarizing dichroic plate 14A.

The polarizing dichroic plate 14A is an element having the property of the region-division wavelength selective filter 60 in addition to the polarizing dichroic plate 14 in the first embodiment. The polarizing dichroic plate 14A includes a center region (inner peripheral part) 81 and a peripheral region (outer peripheral part) 82. In the polarizing dichroic plate 14A, the peripheral region 82 is a region outside the center region 81. In the polarizing dichroic plate 14A, the center region 81 and the peripheral region are desirably provided concentrically.

The center region 81 corresponds to a specific example of the "first region" in the technology of the present disclosure, and the peripheral region corresponds to a specific example of the "second region" in the technology of the present disclosure The polarizing dichroic plate 14A has a property as the wavelength selective filter having mutually different wavelength selective properties between the center region 81 and the peripheral region 82 as well as a property as the polarizing dichroic plate having mutually different polarization properties between the center region 81 and the peripheral region 82. In the center region 81, the polarizing dichroic plate 14A has properties of reflecting blue light of a first polarization component (e.g., S-polarized light) toward the reflective phosphor wheel 11 and of transmitting fluorescent light and blue light of a second polarization component (e.g., P-polarized light) reflected by the reflective phosphor wheel 11. In the center region 81, the polarizing dichroic plate 14A has a property of transmitting yellow light regardless of the polarization direction. In the peripheral region 82, regardless of the polarization direction, the polarizing dichroic plate 14A has properties of reflecting the blue light toward the reflective phosphor wheel 11 and of transmitting the fluorescent light from the phosphor region 111Y reflected by the reflective phosphor wheel 11.

Other configurations, actions, and effects may be substantially similar to those of the optical system according to the first embodiment described above.

<3. Third Embodiment>

Next, description is given of an optical system according to a third embodiment of the present disclosure. It is to be noted that, in the following, components substantially the same as those of the optical system according to the first or second embodiment described above are denoted by the same reference numerals, and descriptions thereof are omitted as appropriate.

Figure 18:
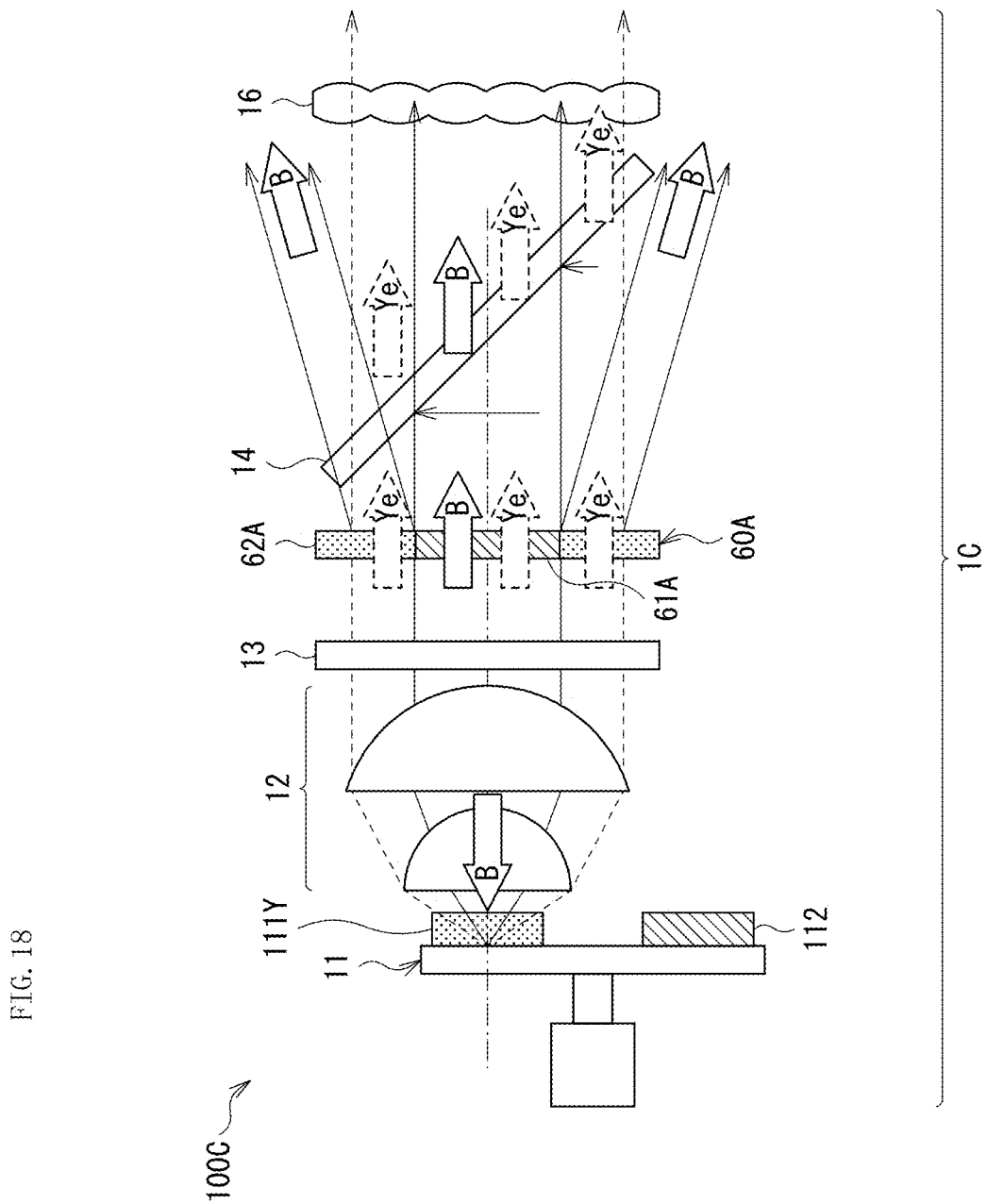
FIG. 18 is a main part configuration diagram schematically illustrating an example of a projector as an optical system according to a third embodiment.

FIG. 18 schematically illustrates a main part configuration of a projector 100C as an optical system according to the third embodiment.

The projector 100C according to the third embodiment includes an illumination optics system 1C instead of the illumination optics system 1 of the projector 100 according to the first embodiment. The illumination optics system 1C of the projector 100C includes a region-division wavelength selective diffraction grating 60A instead of the region-division wavelength selective filter 60 in the first embodiment.

The region-division wavelength selective diffraction grating 60A corresponds to a specific example of the "region division element" in the technology of the present disclosure.

The region-division wavelength selective diffraction grating 60A includes a center region (inner peripheral part) 61A and a peripheral region (outer peripheral part) 62A. In the region-division wavelength selective filter 60, the peripheral region 62A is a region outside the center region 61A. In the region-division wavelength selective diffraction grating 60A, the center region 61A and the peripheral region 62A are desirably provided concentrically.

The center region 61A corresponds to a specific example of the "first region" in the technology of the present disclosure, and the peripheral region 62A corresponds to a specific example of the "second region" in the technology of the present disclosure.

In the region-division wavelength selective diffraction grating 60A, the center region 61A and the peripheral region 62A have mutually different wavelength selective properties. In the region-division wavelength selective diffraction grating 60A, the center region 61A has a property of outputting blue light and fluorescent light from the reflective phosphor wheel 11 to be able to reach the first light valve 31 or the second light valve 32. The peripheral region 62A has a property of outputting only the fluorescent light from the reflective phosphor wheel 11 to be able to reach the first light valve 31 or the second light valve 32. In the center region 61A, the region-division wavelength selective diffraction grating 60A has a property of transmitting blue light and yellow light.

In the region-division wavelength selective diffraction grating 60A, the peripheral region 62A has a property of the wavelength selective diffraction grating. In the peripheral region 62A, the region-division wavelength selective diffraction grating 60A has a property of diffracting the blue light from the reflective phosphor wheel 11 not to reach the first light valve 31 or the second light valve 32. In addition, in the region-division wavelength selective diffraction grating 60A, the peripheral region 62A has a property of the wavelength selective diffraction grating to diffract the fluorescent light from the reflective phosphor wheel 11 to be able to reach the first light valve 31 or the second light valve 32.

Figure 19:
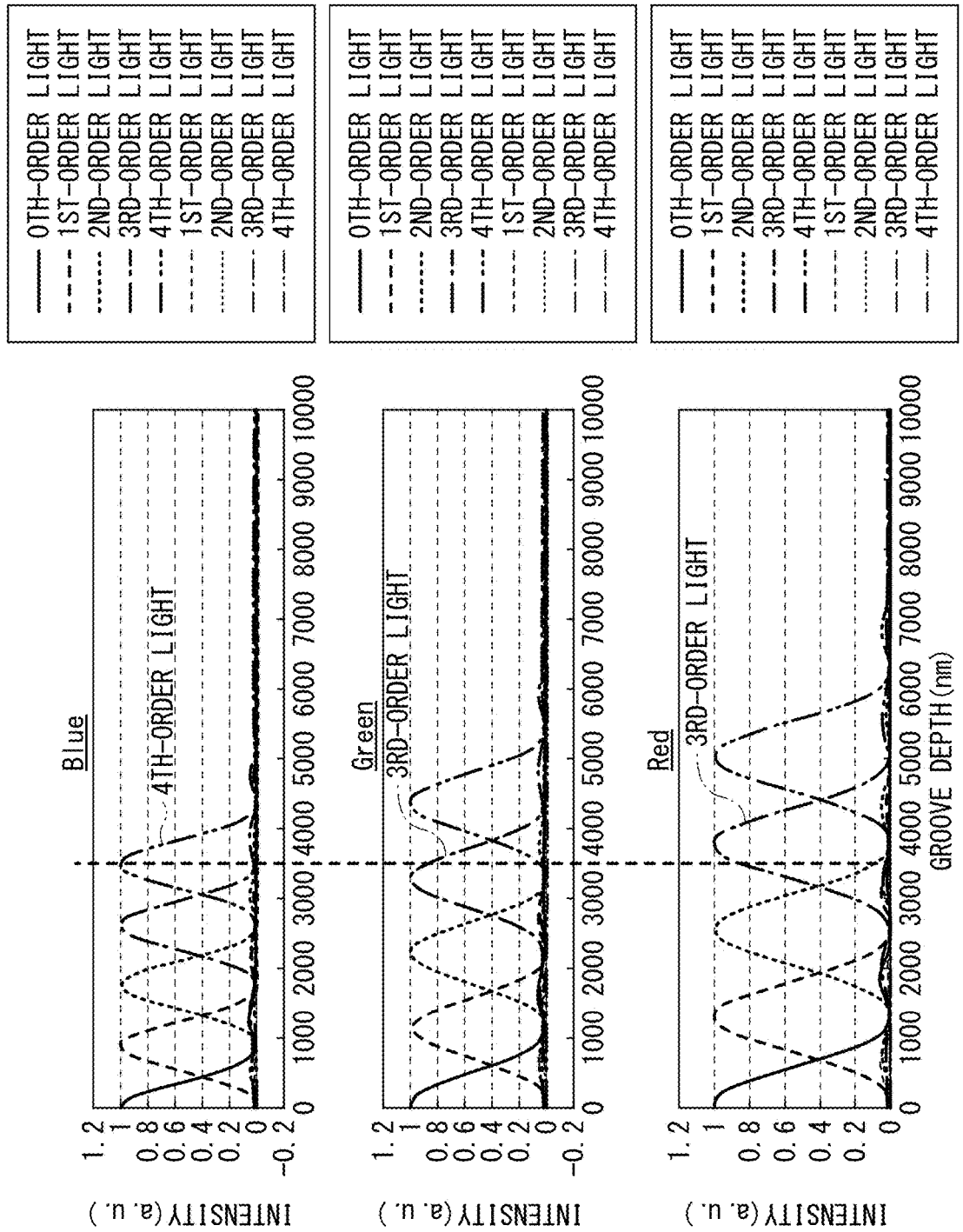
FIG. 19 is an explanatory diagram illustrating, for each wavelength, a relationship between a groove depth and diffraction efficiency in a blazed diffraction grating.
Figure 20:
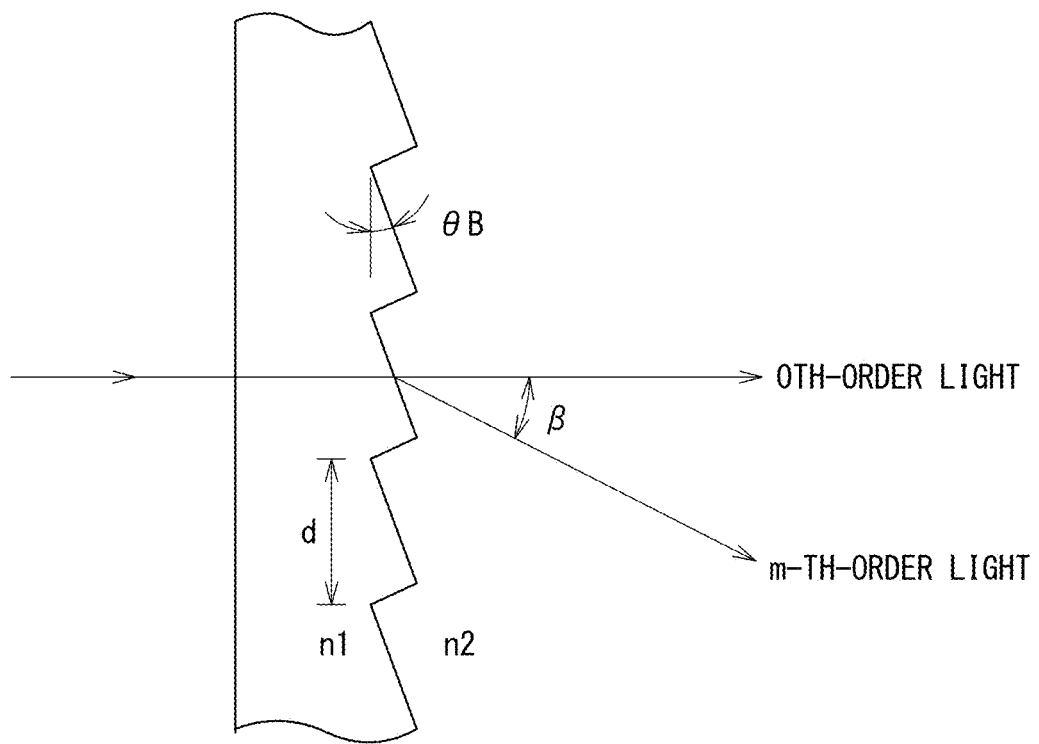
FIG. 20 is a configuration diagram schematically illustrating an example of the blazed diffraction grating.

FIG. 19 illustrates, for each wavelength, a relationship between a groove depth and diffraction efficiency in a blazed diffraction grating. FIG. 20 schematically illustrates an example of the blazed diffraction grating. FIG. 21 illustrates an example of calculation parameters used to calculate diffraction efficiency of the blazed diffraction grating. FIG. 22 illustrates an example of calculation results of the diffraction efficiency of the blazed diffraction grating.

As illustrated in FIG. 19 and FIG. 22, in the blazed diffraction grating, at a groove depth of 3500 nm, for example, red light and green light have the highest diffraction efficiency of a +3rd-order light component, whereas blue light has the highest diffraction efficiency of a +4th-order light component. In addition, the +3rd-order light component and the +4th-order light component have mutually different diffraction angles. For this reason, the difference in the diffraction angle enables the red light as well as the green light and the blue light to be separated from each other. That is, in the peripheral region 62A of the region-division wavelength selective diffraction grating 60A, it is possible to diffract only the blue light in a direction different from those of the green light and the blue light and to deviate the blue light from the optical path of the illumination light. This makes it possible to reduce unnecessary blue light.

For example, as illustrated in FIG. 20, it is assumed that a pitch of a groove, a diffraction angle, and a diffraction order of the blazed diffraction grating are, respectively, d, β, and m. In addition, it is assumed that a refractive index of a medium of the diffraction grating and a refractive index of a medium on output side of the diffraction grating are, respectively, n1 and n2.

Suppose d=0.01 mm, λ denoting a wavelength of light, m of green light=4, and m of blue light=3 hold true, a green light diffraction angle βG and a blue light diffraction angle βB are as follows.

$$d\sin\theta = m\lambda$$

$$\beta = A\sin(m\lambda/d)$$

βB=10.5 deg
βG=9.5 deg

It is to be noted that, in FIG. 21, λB denotes a wavelength of the blue light, λG denotes a wavelength of the green light, and λR denotes a wavelength of the red light. In addition, it is assumed that a refractive index of a medium of the diffraction grating with respect to the blue light and a refractive index of a medium on the output side of the diffraction grating with respect to the blue light are, respectively, n1B and n2B. It is assumed that a refractive index of a medium of the diffraction grating with respect to the green light and a refractive index of a medium on the output side of the diffraction grating with respect to the green light are, respectively, n1G and n2G. It is assumed that a refractive index of a medium of the diffraction grating with respect to the red light and a refractive index of a medium on the output side of the diffraction grating with respect to the red light are, respectively, n1R and n2R.

Other configurations, actions, and effects may be substantially similar to those of the optical system according to the first embodiment described above.

<4. Fourth Embodiment>

Next, description is given of an optical system according to a fourth embodiment of the present disclosure. It is to be noted that, in the following, components substantially the same as those of the optical system according to any of the first to third embodiments described above are denoted by the same reference numerals, and descriptions thereof are omitted as appropriate.

Figure 23:
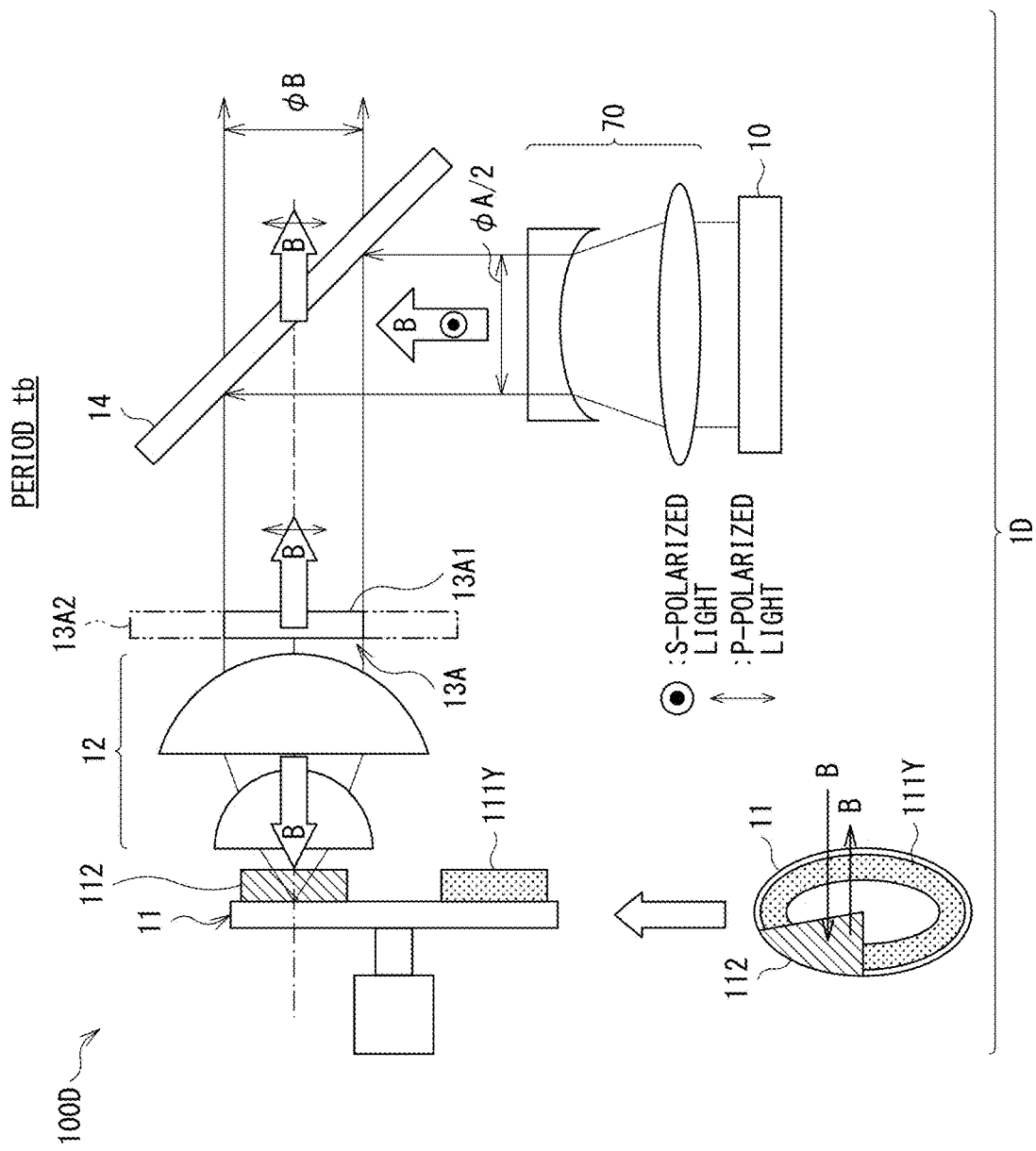
FIG. 23 is a main part configuration diagram schematically illustrating an example of a projector as an optical system according to a fourth embodiment.
Figure 24:
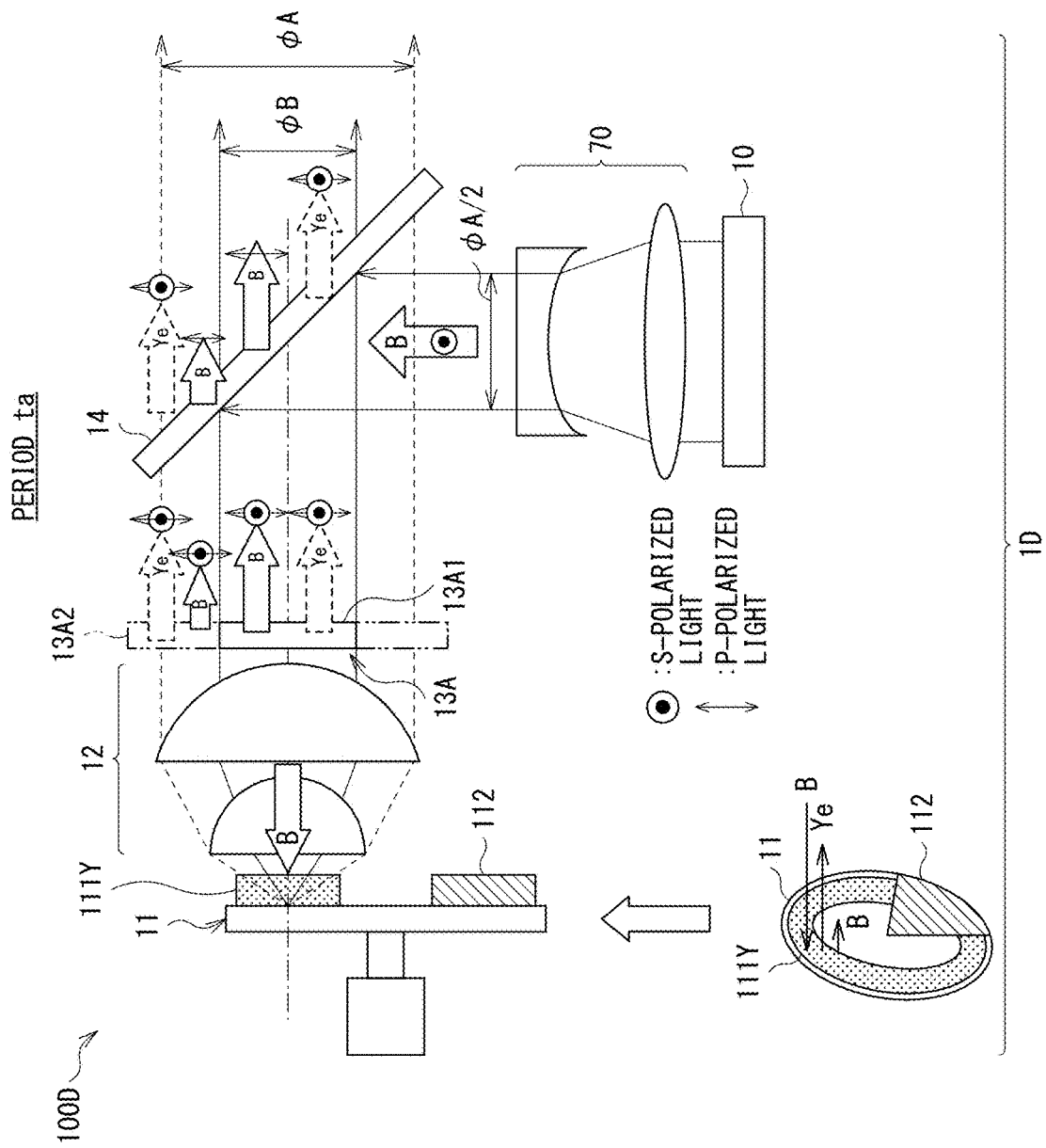
FIG. 24 is a main part configuration diagram schematically illustrating an example of a state of blue light and yellow light in the phosphor light-emission period (second period) in the optical system according to the fourth embodiment.

FIGS. 23 and 24 each schematically illustrate a main part configuration example of a projector 100D as an optical system according to the fourth embodiment. FIG. 23 schematically illustrates an example of a state of blue light in the blue light output period t b. FIG. 24 schematically illustrates an example of a state of blue light and yellow light in the phosphor light-emission period ta.

The projector 100D according to the fourth embodiment includes an illumination optics system 1D instead of the illumination optics system 1 of the projector 100 according to the first embodiment. In the illumination optics system 1D of the projector 100D, the region-division wavelength selective filter 60 in the first embodiment is omitted from the configuration, and a ¼ wave plate 13A is provided instead of the ¼ wave plate 13.

The ¼ wave plate 13A has a property similar to that of the ¼ wave plate 13 in the first embodiment only in a center region (inner peripheral part) 13A1. A peripheral region (outer peripheral part) 13A2 may be a transparent substrate, or the peripheral region 13A2 itself may be omitted from the configuration.

The diameter of the center region 13A1 of the ¼ wave plate 13A is substantially the same as the light flux diameter φB of the light flux from the reflective diffuser region of a reflective phosphor wheel 110.

In the illumination optics system 1D, the light is reflected by the polarizing dichroic plate 14 toward the reflective phosphor wheel 11. At this time, as illustrated in FIG. 23, in the blue light output period tb, the blue light as excitation light, in a state of the light flux diameter φA/2, is transmitted through the center region 13A1 of the ¼ wave plate 13A to reach the reflective diffuser region 112 of the reflective phosphor wheel 11. Here, the blue light reciprocates through the ¼ wave plate 13 to be thereby converted into P-polarized light. The P-polarized blue light is transmitted through the polarizing dichroic plate 14 without loss in a light amount, and is thereafter outputted to the side of the PBS 41.

In the phosphor light-emission period ta, the blue light as excitation light reflected by the polarizing dichroic plate 14 and transmitted through the center region 13A1 of the ¼ wave plate 13A reaches the phosphor region 111Y of the reflective phosphor wheel 11. The phosphor region 111Y reflects and diffuses yellow light as fluorescent light to output the yellow light. It is to be noted that the polarization direction of the yellow light to be outputted is random.

The yellow light passes as it is through the ¼ wave plate 13A in a state of the light flux diameter φA, is transmitted through the polarizing dichroic plate 14 without loss in a light amount, and thereafter is outputted to the side of the PBS 41. Meanwhile, the unnecessary randomly polarized blue light with the light flux diameter φA mixed with the yellow light reaches the polarizing dichroic plate 14. The polarizing dichroic plate 14 transmits only a P-polarized component for the blue light, and thereafter outputs it to the side of the PBS 41. Meanwhile, S-polarized blue light returns again to the side of the phosphor region 111Y. This makes it possible to reduce color mixture of the blue light.

Other configurations, actions, and effects may be substantially similar to those of the optical system according to the first embodiment described above.

<5. Fifth Embodiment>

Next, description is given of an optical system according to a fifth embodiment of the present disclosure. It is to be noted that, in the following, components substantially the same as those of the optical system according to any of the first to fourth embodiments described above are denoted by the same reference numerals, and descriptions thereof are omitted as appropriate.

Figure 25:
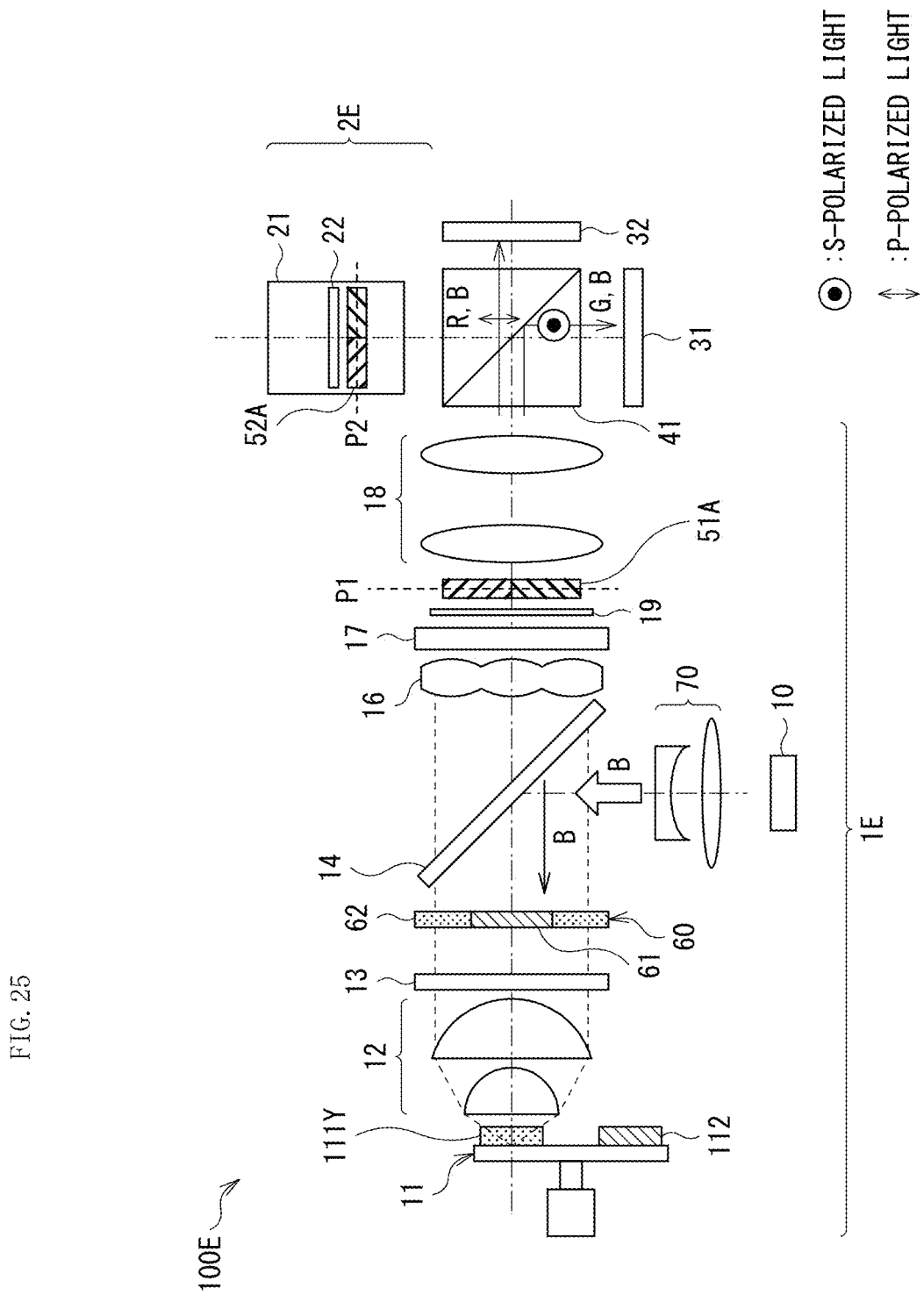
FIG. 25 is a main part configuration diagram schematically illustrating an example of a projector as an optical system according to a fifth embodiment.

FIG. 25 schematically illustrates a main part configuration example of a projector 100E as an optical system according to the fifth embodiment.

In contrast to the configuration of the projector 100 according to the first embodiment, the projector 100E according to the fifth embodiment has a configuration in which, depending on the difference in the polarization direction, the blue light is split by the PBS 41 into two light beams, which are incident on both of the first light valve 31 and the second light valve 32.

The projector 100E according to the fifth embodiment includes an illumination optics system 1E instead of the illumination optics system 1 of the projector 100 according to the first embodiment. The illumination optics system 1E of the projector 100E includes a first region-division wavelength selective wave plate 51A instead of the first wavelength selective wave plate 51 in the first embodiment.

The first region-division wavelength selective wave plate 51A corresponds to a specific example of a "first polarization rotation element" in the technology of the present disclosure.

In addition, the projector 100E according to the fifth embodiment includes a projection optics system 2E instead of the projection optics system 2 of the projector 100 according to the first embodiment. The projection optics system 2E of the projector 100E includes a second region-division wavelength selective wave plate 52A instead of the second wavelength selective wave plate 52 in the first embodiment.

The second region-division wavelength selective wave plate 52A corresponds to a specific example of a "second polarization rotation element" in the technology of the present disclosure.

Figure 26:
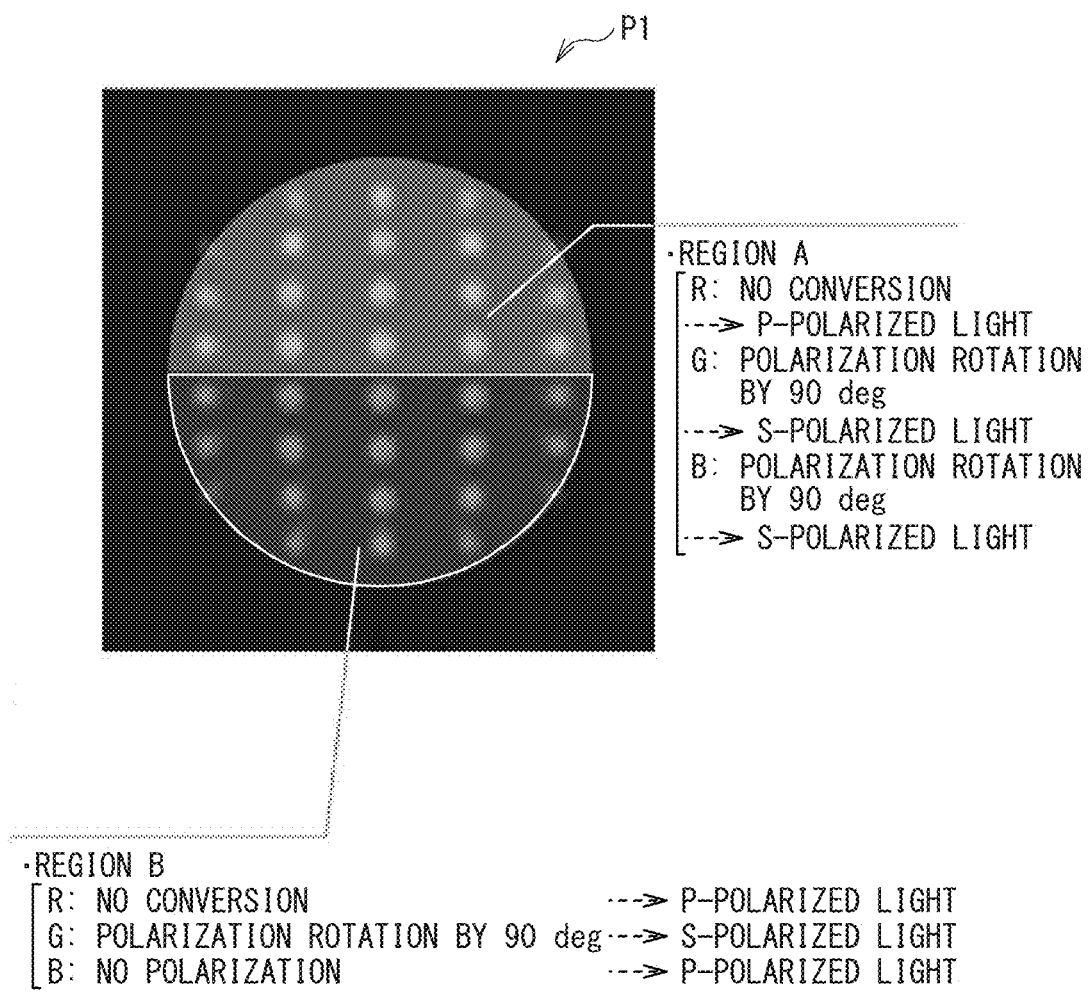
FIG. 26 is a plan view schematically illustrating an example of a configuration and an action of a first region-division wavelength selective wave plate in the optical system according to the fifth embodiment.

FIG. 26 schematically illustrates an example of a configuration and an action of the first region-division wavelength selective wave plate 51A in an optical system according to the fifth embodiment.

The first region-division wavelength selective wave plate 51A is disposed at a pupil position P1 of the illumination optics system 1E. The first region-division wavelength selective wave plate 51A includes a first divided region and a second divided region having mutually different polarization actions. The first divided region and the second divided region are, for example, a region A and a region B illustrated in FIG. 26. In the region A, red light is transmitted as it is without being subjected to polarization conversion. This allows, for example, the red light to be transmitted while remaining as P-polarized light, in the region A. In addition, in the region A, polarization directions of green light and blue light are subjected to polarization rotation by 90 deg. This allows, for example, the green light and the blue light to be converted into S-polarized light, in the region A. In the region B, the red light and the blue light are transmitted as they are without being subjected to the polarization conversion. This allows, for example, the red light and the blue light to be transmitted while remaining as P-polarized light, in the region B. In addition, in the region B, a polarization direction of the green light is subjected to the polarization rotation by 90 deg. This allows, for example, the green light to be converted into S-polarized light, in the region B.

In this manner, in the first region-division wavelength selective wave plate 51A, the region A and the region B have mutually different polarization properties with respect to the blue light. Polarization components of both of the S-polarized light and the P-polarized light are outputted, for the blue light, from the first region-division wavelength selective wave plate 51A. This enables the PBS 41 to split the blue light into two light beams depending on the difference in the polarization direction and enables the two light beams to be incident on both of the first light valve 31 and the second light valve 32.

The second region-division wavelength selective wave plate 52A is disposed at a pupil position P2 of the projection optics system 2E. The second region-division wavelength selective wave plate 52A includes a third divided region and a fourth divided region having mutually different polarization actions. The third divided region has a polarization property corresponding to the first divided region in the first region-division wavelength selective wave plate 51A. The fourth divided region has a polarization property corresponding to the second divided region in the first region-division wavelength selective wave plate 51A.

The pupil position P1 of the illumination optics system 1E and the pupil position P2 of the projection optics system 2E are conjugate to each other. The first divided region and the third divided region in the first region-division wavelength selective wave plate 51A are conjugate to each other. In addition, the second divided region and the fourth divided region are conjugate to each other.

It is to be noted that the first region-division wavelength selective wave plate 51A may be disposed at a position in the vicinity of the pupil position P1 of the illumination optics system 1E. However, the first region-division wavelength selective wave plate 51A is preferably disposed on an optical path between the PS converter 17 and a relay lens 18 inside the illumination optics system 1E. In addition, the second region-division wavelength selective wave plate 52A may be disposed at a position in the vicinity of the pupil position P2 of the projection optics system 2E. However, the second region-division wavelength selective wave plate is preferably disposed on an optical path between two lenses before and after a diaphragm position inside the projection optics system 2E.

Other configurations, actions, and effects may be substantially similar to those of the optical system according to the first embodiment described above.

<6. Sixth Embodiment>

Next, description is given of an optical system according to a sixth embodiment of the present disclosure. It is to be noted that, in the following, components substantially the same as those of the optical system according to any of the first to fifth embodiments described above are denoted by the same reference numerals, and descriptions thereof are omitted as appropriate.

Figure 27:
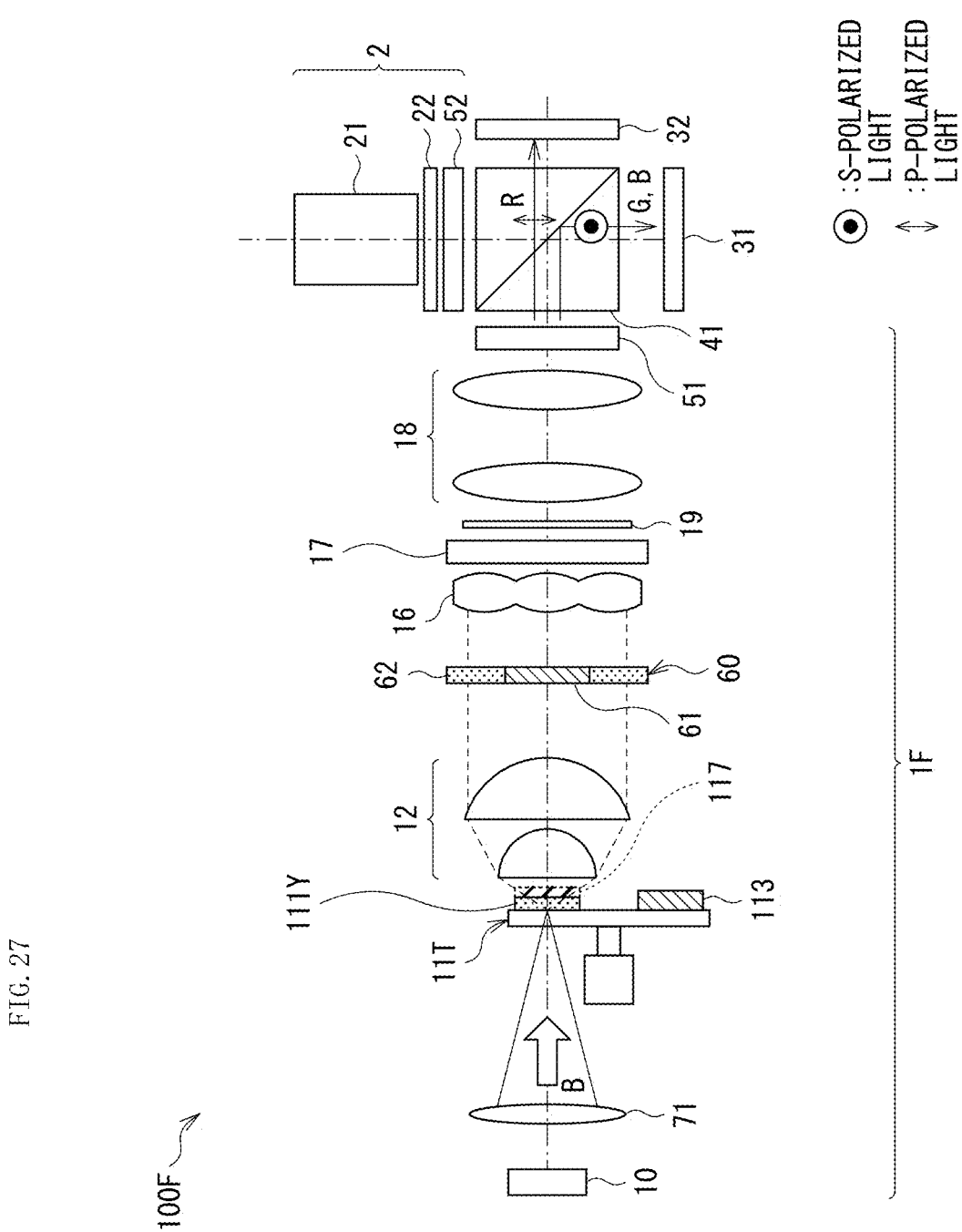
FIG. 27 is a main part configuration diagram schematically illustrating an example of a projector as an optical system according to a sixth embodiment.

FIG. 27 schematically illustrates a main part configuration of a projector 100F as an optical system according to the sixth embodiment.

The projector 100F according to the sixth embodiment is of a two-panel type, and adopts a method of using a transmissive phosphor wheel 11T.

The projector 100F according to the sixth embodiment includes an illumination optics system 1F instead of the illumination optics system 1 of the projector 100 according to the first embodiment. The illumination optics system 1F of the projector 100F includes the transmissive phosphor wheel 11T and a light-condensing optics system 71 instead of the reflective phosphor wheel 11, the reduction optics system 70, and the polarizing dichroic plate 14 in the first embodiment. In addition, the ¼ wave plate 13 is omitted from the configuration.

Figure 28:
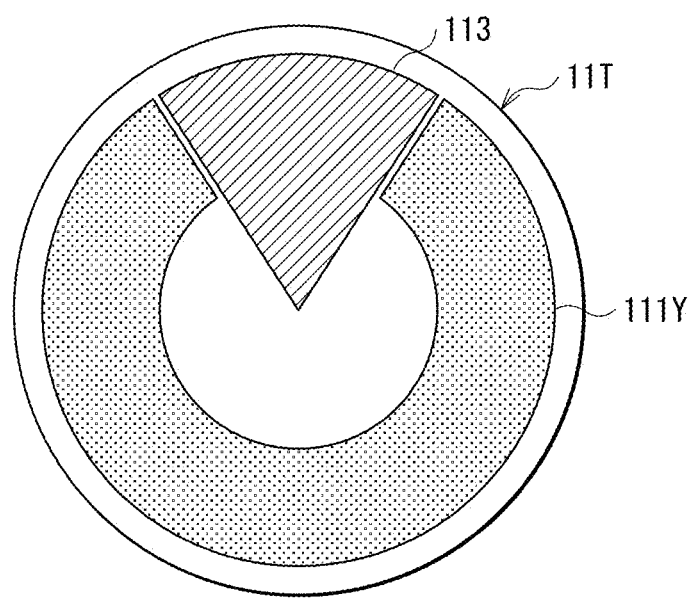
FIG. 28 is a plan view schematically illustrating a configuration example of a transmissive phosphor wheel in the optical system according to the sixth embodiment.

FIG. 28 schematically illustrates a planar configuration example of the transmissive phosphor wheel 11T in the optical system according to the sixth embodiment.

The transmissive phosphor wheel 11T includes the phosphor region 111Y and a transmissive diffuser region 113 as illustrated in FIG. 28. Irradiating the phosphor region 111Y with blue light as excitation light allows yellow light to be obtained as fluorescent light. The phosphor region 111Y transmits and diffuses the yellow light as the fluorescent light to output the yellow light. The transmissive diffuser region 113 transmits and diffuses the blue light in a state of holding a polarization direction to output the blue light.

It is to be noted that a blue cut filter 117 may be provided on output side of the phosphor region 111Y. This makes it possible to further reduce the blue light mixed with the yellow light.

Other configurations, actions, and effects may be substantially similar to those of the optical system according to the first embodiment described above.

<7. Seventh Embodiment>

Next, description is given of an optical system according to a seventh embodiment of the present disclosure. It is to be noted that, in the following, components substantially the same as those of the optical system according to any of the first to sixth embodiments described above are denoted by the same reference numerals, and descriptions thereof are omitted as appropriate.

Figure 29:
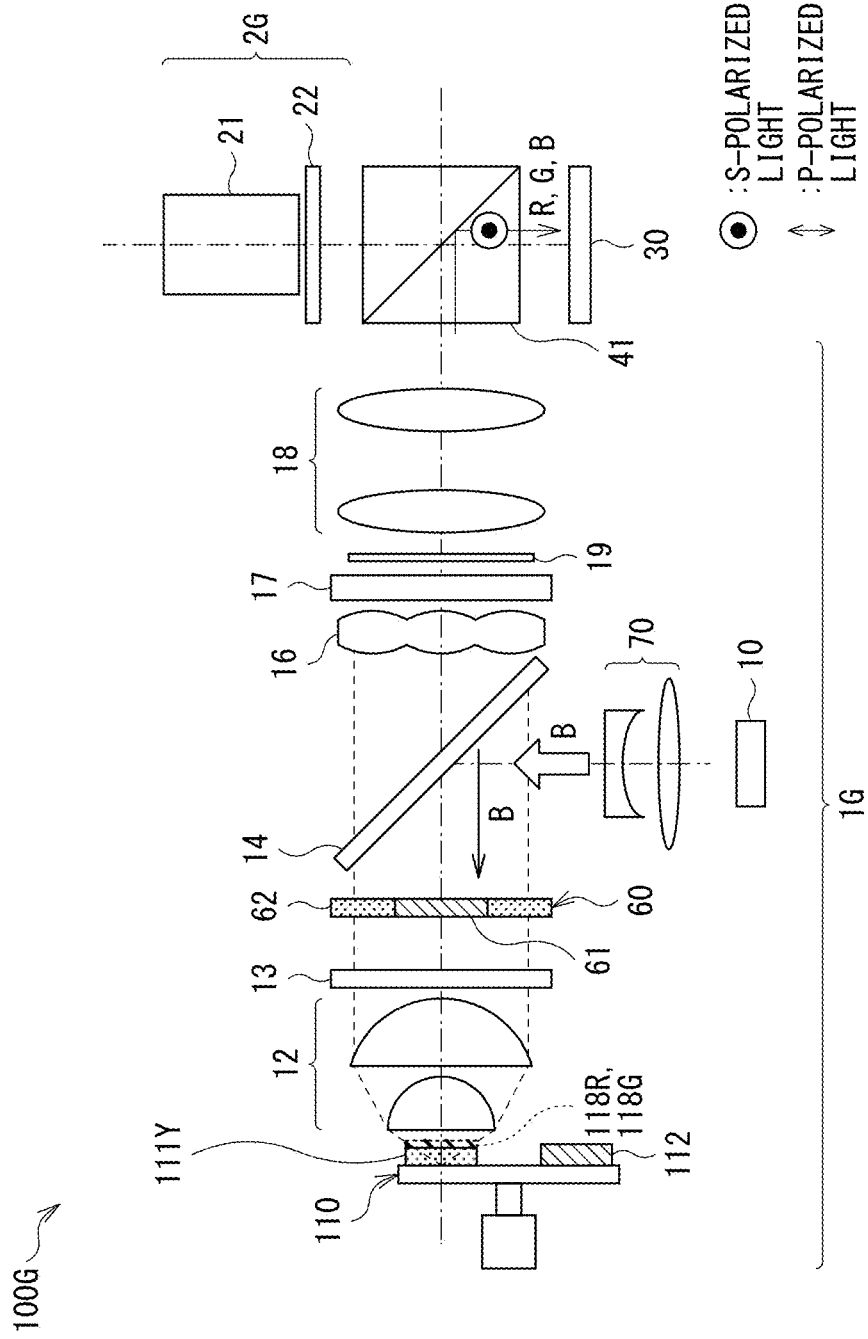
FIG. 29 is a main part configuration diagram schematically illustrating an example of a projector as an optical system according to a seventh embodiment.

FIG. 29 schematically illustrates a main part configuration of a projector 100G as an optical system according to the seventh embodiment.

The projector 100G according to the seventh embodiment is of a single-panel type, and adopts a method of using the reflective phosphor wheel 110.

The projector 100G according to the seventh embodiment includes an illumination optics system 1G instead of the illumination optics system 1 of the projector 100 according to the first embodiment. The illumination optics system 1G of the projector 100G includes the reflective phosphor wheel 110 instead of the reflective phosphor wheel 11 in the first embodiment. In addition, the first wavelength selective wave plate 51 is omitted from the configuration.

In addition, the projector 100G according to the seventh embodiment includes a projection optics system 2G instead of the projection optics system 2 of the projector 100 according to the first embodiment. In the projection optics system 2G of the projector 100G, the second wavelength selective wave plate 52 in the first embodiment is omitted from the configuration.

In addition, the projector 100G according to the seventh embodiment includes one light valve 30 instead of the first light valve 31 and the second light valve 32. Red light, green light, and blue light are time-divisionally incident on the one light valve 30 via the PBS 41. The one light valve 30 modulates the color light beams time-divisionally. Each color light beam after having been modulated forms time division image light. The image light of each color light beam is projected by the projection optics system 2G onto a projection surface such as a screen.

Figure 30:
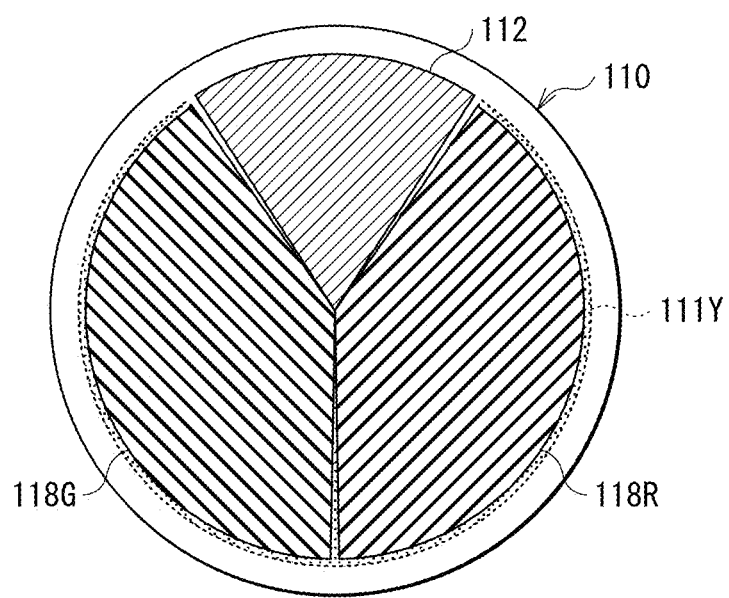
FIG. 30 is a plan view schematically illustrating a configuration example of a reflective phosphor wheel in the optical system according to the seventh embodiment.

FIG. 30 schematically illustrates a planar configuration example of the reflective phosphor wheel 110.

The reflective phosphor wheel 110 includes the phosphor region 111Y and the reflective diffuser region 112. The phosphor region 111Y is provided with a red transmissive dichroic filter 118R and a green transmissive dichroic filter 118G. Irradiating blue light as excitation light allows yellow light to be obtained as fluorescent light, and red light is outputted from a region provided with the red transmissive dichroic filter 118R. In addition, green light is outputted from a region provided with the green transmissive dichroic filter 118G.

Other configurations, actions, and effects may be substantially similar to those of the optical system according to the first embodiment described above.

<8. Eighth Embodiment>

Next, description is given of an optical system according to an eighth embodiment of the present disclosure. It is to be noted that, in the following, components substantially the same as those of the optical system according to any of the first to seventh embodiments described above are denoted by the same reference numerals, and descriptions thereof are omitted as appropriate.

Figure 31:
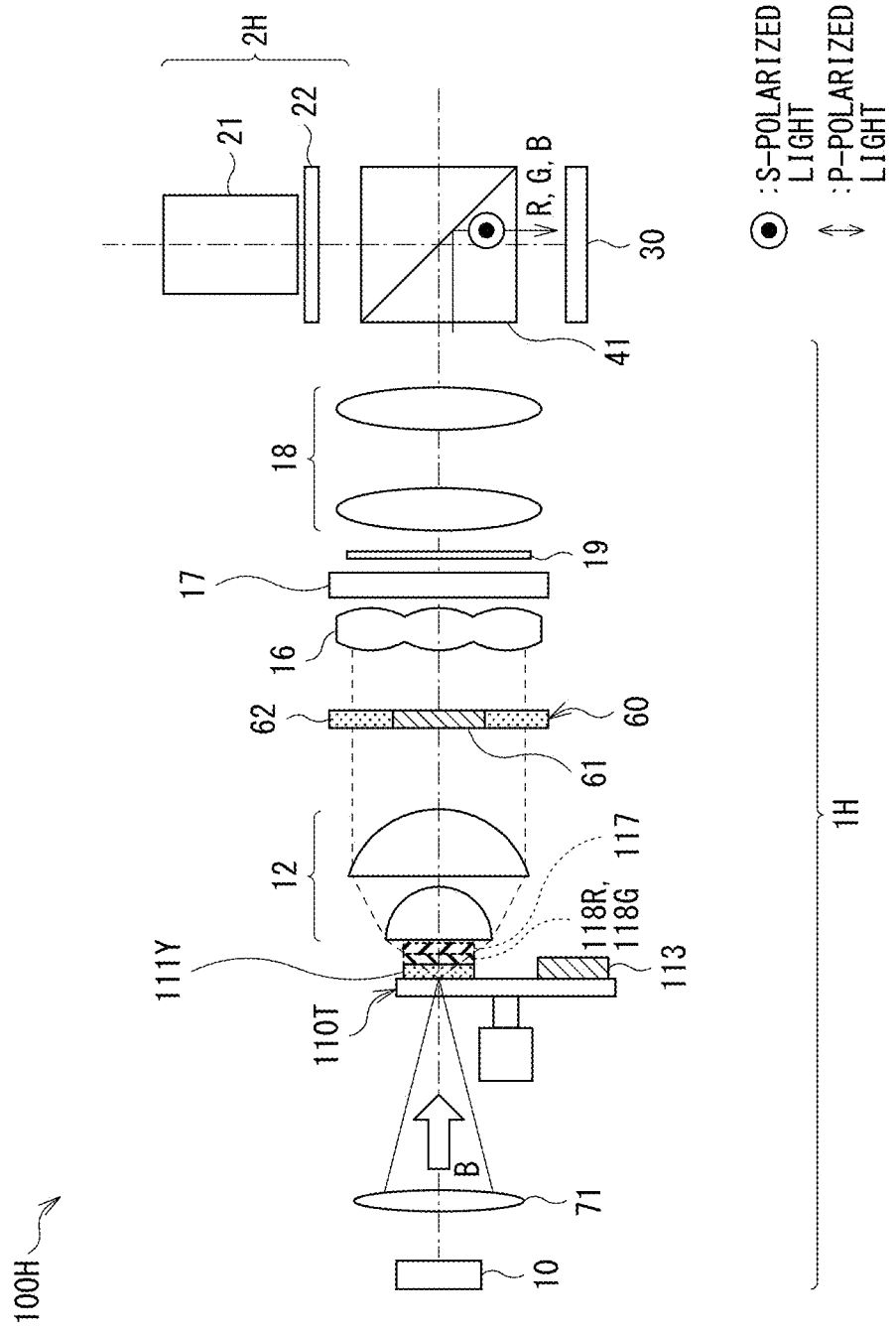
FIG. 31 is a main part configuration diagram schematically illustrating an example of a projector as an optical system according to an eighth embodiment.

FIG. 31 schematically illustrates a main part configuration example of a projector 100H as an optical system according to the eighth embodiment.

The projector 100H according to the eighth embodiment is of a single-panel type, and adopts a method of using a transmissive phosphor wheel 110T.

The projector 100H according to the eighth embodiment includes an illumination optics system 1H instead of the illumination optics system 1F of the projector 100F (FIG. 27) according to the sixth embodiment. The illumination optics system 1H of the projector 100H includes the transmissive phosphor wheel 110T instead of the reflective phosphor wheel 11 in the sixth embodiment. In addition, the first wavelength selective wave plate 51 is omitted from the configuration.

In addition, the projector 100H according to the eighth embodiment includes a projection optics system 2H instead of the projection optics system 2 of the projector 100F according to the sixth embodiment. In the projection optics system 2H of the projector 100H, the second wavelength selective wave plate 52 in the sixth embodiment is omitted from the configuration.

In addition, the projector 100H according to the eighth embodiment includes the one light valve 30 instead of the first light valve 31 and the second light valve 32. Red light, green light, and blue light are time-divisionally incident on the one light valve 30 via the PBS 41. The one light valve 30 modulates the color light beams time-divisionally. Each color light beam after having been modulated forms time division image light. The image light of each color light beam is projected by the projection optics system 2H onto a projection surface such as a screen.

Figure 32:
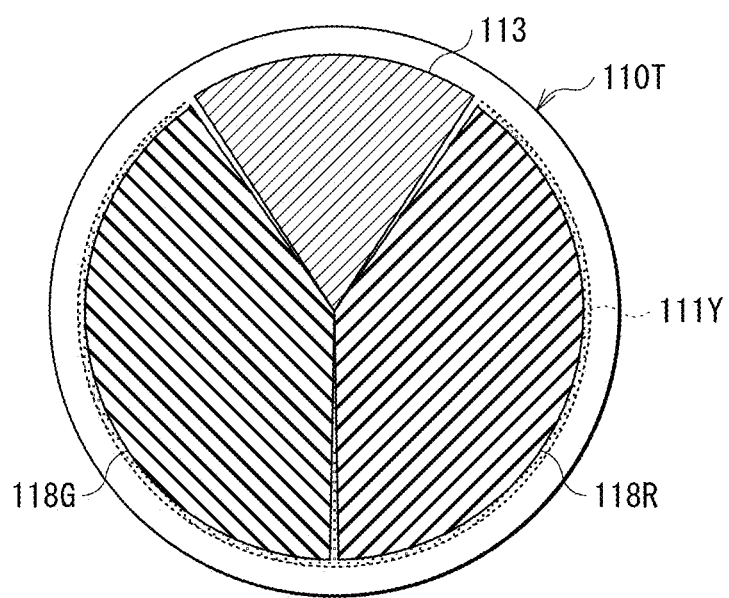
FIG. 32 is a plan view schematically illustrating a configuration example of a transmissive phosphor wheel in the optical system according to the eighth embodiment.

FIG. 32 schematically illustrates a planar configuration example of the transmissive phosphor wheel 110T in the optical system according to the eighth embodiment.

The transmissive phosphor wheel 110 T includes the phosphor region 111Y and the transmissive diffuser region 113. The phosphor region 111Y is provided with the red transmissive dichroic filter 118R and the green transmissive dichroic filter 118G. Irradiating blue light as excitation light allows yellow light to be obtained as fluorescent light, and red light is outputted from a region provided with the red transmissive dichroic filter 118R. In addition, green light is outputted from a region provided with the green transmissive dichroic filter 118G.

It is to be noted that the blue cut filter 117 may be provided on the output side of the phosphor region 111Y. This makes it possible to further reduce the blue light mixed with the yellow light.

Other configurations, actions, and effects may be substantially similar to those of the optical system according to the first or sixth embodiment described above.

<9. Other Embodiments>

The technology according to the present disclosure is not limited to the descriptions of the respective embodiments described above, and may be modified in a wide variety of ways.

For example, the present technology may also have the following configurations. According to the present technology having the following configuration, there is provided a region division element including a first region and a second region having mutually different output properties with respect to a first color light beam, thus making it possible to improve a color separation property and to suppress a deterioration in a color gamut.

(1)

An optical system including:

a fluorescent unit including a phosphor region excited by a first color light beam to output fluorescent light including at least one color light beam, the fluorescent unit outputting the first color light beam in a first period and outputting the fluorescent light in a second period;

one or two light valves illuminated by at least one of the first color light beam or the fluorescent light; and a region division element including a first region and a second region and being disposed on an optical path between the fluorescent unit and the one or two light valves, the first region having a property of outputting the first color light beam and the fluorescent light from the fluorescent unit to be able to reach the one or two light valves, the second region having a property of outputting the fluorescent light from the fluorescent unit to be able to reach the one or two light valves.

(2)

The optical system according to (1), in which the second region includes a region outside the first region in the region division element.

(3)

The optical system according to (2), in which the first region and the second region are provided concentrically in the region division element.

(4)

The optical system according to any one of (1) to (3), in which the region division element includes a wavelength selective filter having mutually different wavelength selective properties between the first region and the second region.

(5)

The optical system according to (4), further including a polarizing dichroic plate disposed on the optical path between the fluorescent unit and the one or two light valves, the polarizing dichroic plate reflecting the first color light beam toward the fluorescent unit and transmitting the first color light beam and the fluorescent light reflected by the fluorescent unit, in which the wavelength selective filter is disposed on an optical path between the fluorescent unit and the polarizing dichroic plate.

(6)

The optical system according to (4), further including a polarizing dichroic plate disposed on the optical path between the fluorescent unit and the one or two light valves, the polarizing dichroic plate reflecting the first color light beam toward the fluorescent unit and transmitting the first color light beam and the fluorescent light reflected by the fluorescent unit, in which the wavelength selective filter is disposed on an optical path between the polarizing dichroic plate and the one or two light valves.

(7)

The optical system according to any one of (1) to (4), in which the region division element has a property as the wavelength selective filter having mutually different wavelength selective properties between the first region and the second region and a property as a polarizing dichroic plate having mutually different polarization properties between the first region and the second region, the region division element has properties, in the first region, of reflecting the first color light beam of a first polarization component toward the fluorescent unit and of transmitting the fluorescent light and the first color light beam of a second polarization component from the fluorescent unit reflected by the fluorescent unit, and the region division element has properties, in the second region, of reflecting the first color light beam toward the fluorescent unit, regardless of a polarization component, and of transmitting the fluorescent light from the fluorescent unit reflected by the fluorescent unit.

(8)

The optical system according to any one of (1) to (3), in which the region division element has a property of a wavelength selective diffraction grating that, in the second region, diffracts the first color light beam from the fluorescent unit not to reach the one or two light valves, and diffracts the fluorescent light from the fluorescent unit to be able to reach the one or two light valves.

(9)

The optical system according to any one of (1) to (8), in which the fluorescent unit further includes a reflective diffuser region that reflects and outputs the first color light beam in the first period in a state of holding a polarization direction, and the phosphor region reflects and outputs the fluorescent light in the second period.

(10)

The optical system according to any one of (1) to (4), in which the fluorescent unit further includes a transmissive diffuser region that transmits and outputs the first color light beam in the first period in a state of holding a polarization direction, and the phosphor region transmits and outputs the fluorescent light in the second period.

(11)

The optical system according to any one of (1) to (10), in which the fluorescent light includes a second color light beam and a third color light beam, the two light valves include a first light valve and a second light valve, the first light valve is illuminated time-divisionally by the first color light beam and the second color light beam, and the second light valve is illuminated by the third color light beam or illuminated time-divisionally by the first color light beam and the third color light beam.

(12)

The optical system according to (11), further including:

an illumination optics system that generates illumination light for the two light valves on a basis of the first color light beam and the fluorescent light from the fluorescent unit;

a first polarization rotation element disposed at a pupil position of the illumination optics system and including a first divided region and a second divided region, the first divided region and the second divided region having mutually different polarization properties with respect to the first color light beam;

a projection optics system on which the multiple color light beams after having been modulated by the multiple light valves are incident; and a second polarization rotation element disposed at a pupil position of the projection optics system conjugate to the pupil position of the illumination optics system and including a third divided region and a fourth divided region, the third divided region having a polarization property corresponding to the first divided region, the fourth divided region having a polarization property corresponding to the second divided region.

(13)

The optical system according to any one of (1) to (10), in which the fluorescent light includes the second color light beam and the third color light beam, and the one light valve is illuminated time-divisionally by the first to third color light beams.

This application claims the benefit of Japanese Priority Patent Application JP2020-17995 filed with the Japan Patent Office on Feb. 5, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An optical system, comprising:
   a fluorescent unit including a phosphor region excited by a first color light beam to output fluorescent light including at least one color light beam, the fluorescent unit outputting the first color light beam in a first period and outputting the fluorescent light in a second period;
   one or two light valves illuminated by at least one of the first color light beam or the fluorescent light;
   a region division element including a first region and a second region and being disposed on an optical path between the fluorescent unit and the one or two light valves, the first region having a property of outputting the first color light beam and the fluorescent light from the fluorescent unit to be able to reach the one or two light valves, the second region having a property of outputting the fluorescent light from the fluorescent unit to be able to reach the one or two light valves, wherein the region division element comprises a wavelength selective filter having mutually different wavelength selective properties between the first region and the second region; and
   a polarizing dichroic plate disposed on the optical path between the fluorescent unit and the one or two light valves, the polarizing dichroic plate reflecting the first color light beam toward the fluorescent unit and transmitting the first color light beam and the fluorescent light reflected by the fluorescent unit, wherein
   the wavelength selective filter is disposed on an optical path between the fluorescent unit and the polarizing dichroic plate.

2. The optical system according to claim 1, wherein the second region comprises a region outside the first region in the region division element.

3. The optical system according to claim 2, wherein the first region and the second region are provided concentrically in the region division element.

4. An optical system, comprising:
   a fluorescent unit including a phosphor region excited by a first color light beam to output fluorescent light including at least one color light beam, the fluorescent unit outputting the first color light beam in a first period and outputting the fluorescent light in a second period;
   one or two light valves illuminated by at least one of the first color light beam or the fluorescent light and
   a region division element including a first region and a second region and being disposed on an optical path between the fluorescent unit and the one or two light valves, the first region having a property of outputting the first color light beam and the fluorescent light from the fluorescent unit to be able to reach the one or two light valves, the second region having a property of outputting the fluorescent light from the fluorescent unit to be able to reach the one or two light valves, wherein
   the region division element has a property as a wavelength selective filter having mutually different wavelength selective properties between the first region and the second region and a property as a polarizing dichroic plate having mutually different polarization properties between the first region and the second region,
   the region division element has properties, in the first region, of reflecting the first color light beam of a first polarization component toward the fluorescent unit and of transmitting the fluorescent light and the first color light beam of a second polarization component from the fluorescent unit reflected by the fluorescent unit, and
   the region division element has properties, in the second region, of reflecting the first color light beam toward the fluorescent unit, regardless of a polarization component, and of transmitting the fluorescent light from the fluorescent unit reflected by the fluorescent unit.

5. The optical system according to claim 4, wherein the region division element comprises a wavelength selective filter having mutually different wavelength selective properties between the first region and the second region.

6. An optical system, comprising:
   a fluorescent unit including a phosphor region excited by a first color light beam to output fluorescent light including at least one color light beam, the fluorescent unit outputting the first color light beam in a first period and outputting the fluorescent light in a second period;
   one or two light valves illuminated by at least one of the first color light beam or the fluorescent light;
   a region division element including a first region and a second region and being disposed on an optical path between the fluorescent unit and the one or two light valves, the first region having a property of outputting the first color light beam and the fluorescent light from the fluorescent unit to be able to reach the one or two light valves, the second region having a property of outputting the fluorescent light from the fluorescent unit to be able to reach the one or two light valves, wherein the region division element comprises a wavelength selective filter having mutually different wavelength selective properties between the first region and the second region; and
   a polarizing dichroic plate disposed on the optical path between the fluorescent unit and the one or two light valves, the polarizing dichroic plate reflecting the first color light beam toward the fluorescent unit and transmitting the first color light beam and the fluorescent light reflected by the fluorescent unit, wherein
   the wavelength selective filter is disposed on an optical path between the polarizing dichroic plate and the one or two light valves.

7. An optical system, comprising:
   a fluorescent unit including a phosphor region excited by a first color light beam to output fluorescent light including at least one color light beam, the fluorescent unit outputting the first color light beam in a first period and outputting the fluorescent light in a second period;
   one or two light valves illuminated by at least one of the first color light beam or the fluorescent light; and
   a region division element including a first region and a second region and being disposed on an optical path between the fluorescent unit and the one or two light valves, the first region having a property of outputting the first color light beam and the fluorescent light from the fluorescent unit to be able to reach the one or two light valves, the second region having a property of outputting the fluorescent light from the fluorescent unit to be able to reach the one or two light valves, wherein the region division element has a property of a wavelength selective diffraction grating that, in the second region, diffracts the first color light beam from the fluorescent unit not to reach the one or two light valves, and diffracts the fluorescent light from the fluorescent unit to be able to reach the one or two light valves.

8. An optical system, comprising:

a fluorescent unit including a phosphor region excited by a first color light beam to output fluorescent light including at least one color light beam, the fluorescent unit outputting the first color light beam in a first period and outputting the fluorescent light in a second period;

one or two light valves illuminated by at least one of the first color light beam or the fluorescent light; and a region division element including a first region and a second region and being disposed on an optical path between the fluorescent unit and the one or two light valves, the first region having a property of outputting the first color light beam and the fluorescent light from the fluorescent unit to be able to reach the one or two light valves, the second region having a property of outputting the fluorescent light from the fluorescent unit to be able to reach the one or two light valves, wherein the fluorescent unit further includes a reflective diffuser region that reflects and outputs the first color light beam in the first period in a state of holding a polarization direction, and the phosphor region reflects and outputs the fluorescent light in the second period.

9. An optical system, comprising:

a fluorescent unit including a phosphor region excited by a first color light beam to output fluorescent light including at least one color light beam, the fluorescent unit outputting the first color light beam in a first period and outputting the fluorescent light in a second period;

one or two light valves illuminated by at least one of the first color light beam or the fluorescent light; and a region division element including a first region and a second region and being disposed on an optical path between the fluorescent unit and the one or two light valves, the first region having a property of outputting the first color light beam and the fluorescent light from the fluorescent unit to be able to reach the one or two light valves, the second region having a property of outputting the fluorescent light from the fluorescent unit to be able to reach the one or two light valves, wherein the fluorescent unit further includes a transmissive diffuser region that transmits and outputs the first color light beam in the first period in a state of holding a polarization direction, and the phosphor region transmits and outputs the fluorescent light in the second period.

10. The optical system according to claim 1, wherein the fluorescent light includes a second color light beam and a third color light beam, the two light valves include a first light valve and a second light valve, the first light valve is illuminated time-divisionally by the first color light beam and the second color light beam, and the second light valve is illuminated by the third color light beam or illuminated time-divisionally by the first color light beam and the third color light beam.

11. An optical system, comprising:

a fluorescent unit including a phosphor region excited by a first color light beam to output fluorescent light including at least one color light beam, the fluorescent unit outputting the first color light beam in a first period and outputting the fluorescent light in a second period;

one or two light valves illuminated by at least one of the first color light beam or the fluorescent light; and a region division element including a first region and a second region and being disposed on an optical path between the fluorescent unit and the one or two light valves, the first region having a property of outputting the first color light beam and the fluorescent light from the fluorescent unit to be able to reach the one or two light valves, the second region having a property of outputting the fluorescent light from the fluorescent unit to be able to reach the one or two light valves, wherein the fluorescent light includes a second color light beam and a third color light beam the two light valves include a first light valve and a second light valve, the first light valve is illuminated time-divisionally by the first color light beam and the second color light beam, and the second light valve is illuminated by the third color light beam or illuminated time-divisionally by the first color light beam and the third color light beam;

an illumination optics system that generates illumination light for the two light valves on a basis of the first color light beam and the fluorescent light from the fluorescent unit;

a first polarization rotation element disposed at a pupil position of the illumination optics system and including a first divided region and a second divided region, the first divided region and the second divided region having mutually different polarization properties with respect to the first color light beam;

a projection optics system on which the first, second, and third color light beams after having been modulated by the first and second light valves are incident; and a second polarization rotation element disposed at a pupil position of the projection optics system conjugate to the pupil position of the illumination optics system and including a third divided region and a fourth divided region, the third divided region having a polarization property corresponding to the first divided region, the fourth divided region having a polarization property corresponding to the second divided region.

12. The optical system according to claim 1, wherein the fluorescent light includes a second color light beam and a third color light beam, and the one light valve is illuminated time-divisionally by the first, second, and third color light beams.

* * * * *